(12) United States Patent
Baumgartner et al.

(10) Patent No.: US 7,121,387 B2
(45) Date of Patent: *Oct. 17, 2006

(54) DISK BRAKE HAVING A BRAKE APPLICATION SYSTEM WITH A ROTARY LEVER

(75) Inventors: Johann Baumgartner, Moosburg (DE); Dieter Bieker, Oberaudorf (DE); Wolfgang Pahle, Heilbronn (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/068,396

(22) Filed: Mar. 1, 2005

(65) Prior Publication Data

US 2005/0145450 A1    Jul. 7, 2005

Related U.S. Application Data

(63) Continuation of application No. 10/344,764, filed on Jul. 21, 2003, now Pat. No. 6,899,204.

(51) Int. Cl.
*F16D 55/08* (2006.01)
(52) U.S. Cl. .................................................. 188/72.9
(58) Field of Classification Search ............. 188/71.7, 188/71.8, 71.9, 72.9, 72.1, 71.1, 72.6, 72.7, 188/72.8
See application file for complete search history.

(56) References Cited

U.S. PATENT DOCUMENTS

| | | | |
|---|---|---|---|
| 3,059,731 A | 10/1962 | Gancel et al. | |
| 3,371,753 A | 3/1968 | Meier | |
| 3,498,421 A | 3/1970 | Ohmayer | |
| 3,534,835 A | 10/1970 | Meier | |
| 3,869,024 A | 3/1975 | Hauth et al. | |
| 4,050,458 A | 9/1977 | Friend | |
| 4,494,630 A | 1/1985 | Stoka et al. | |
| 4,784,244 A | 11/1988 | Carre et al. | |
| 4,799,575 A | 1/1989 | Kroniger | |
| 4,850,457 A | 7/1989 | Taig | |
| 5,090,518 A | 2/1992 | Schenk et al. | |
| 5,161,650 A | 11/1992 | Taig | |
| 5,343,984 A * | 9/1994 | Bieker et al. ............... | 188/71.9 |
| 5,433,298 A * | 7/1995 | Antony et al. ............. | 188/72.7 |
| 5,439,078 A | 8/1995 | Baumgartner et al. | |
| 5,568,845 A * | 10/1996 | Baumgartner et al. ..... | 188/71.9 |
| 5,570,937 A | 11/1996 | Wolfsried | |
| 5,582,273 A * | 12/1996 | Baumgartner et al. ..... | 188/72.6 |
| 5,622,240 A * | 4/1997 | Hartl ........................... | 188/72.6 |
| 5,833,035 A * | 11/1998 | Severinsson ............... | 188/72.7 |
| 6,000,507 A | 12/1999 | Bohm et al. | |

(Continued)

FOREIGN PATENT DOCUMENTS

DE    1600142    4/1970

(Continued)

*Primary Examiner*—Devon Kramer
(74) *Attorney, Agent, or Firm*—Crowell & Moring LLP

(57) ABSTRACT

The invention relates to a brake disk, particularly for commercial vehicles, comprising a brake caliper covering a brake disk, a tensing device arranged in a brake caliper for clamping the brake pads on both sides of the brake disk in the direction thereof, and at least one regulating system arranged in the brake caliper in order to equalize the brake pad and/or disk deterioration by adjusting the distance between the brake pad and the brake disk, whereby the regulating system comprises a regulating rotational device. The invention is characterized in that at least one regulating rotational device is provided on each side of the brake disk to adjust the axial distances between the brake pads and the brake disk.

18 Claims, 32 Drawing Sheets

U.S. PATENT DOCUMENTS

| | | |
|---|---|---|
| 6,244,391 B1 | 6/2001 | Bunker |
| 6,250,434 B1 | 6/2001 | Baumgartner et al. |
| 6,293,370 B1 | 9/2001 | McCann et al. |
| 6,354,407 B1 * | 3/2002 | Heinlein et al. ............ 188/71.1 |
| 6,409,289 B1 | 6/2002 | Wagner et al. |
| 6,471,015 B1 | 10/2002 | Ralea et al. |
| 6,471,017 B1 | 10/2002 | Booz et al. |
| 6,554,646 B1 * | 4/2003 | Casey ......................... 439/607 |
| 6,659,235 B1 | 12/2003 | Ortegren et al. |
| 6,763,918 B1 | 7/2004 | Kapaan et al. |
| 2003/0173164 A1 * | 9/2003 | Angerfors .................. 188/71.7 |
| 2004/0026181 A1 | 2/2004 | Baumgartner et al. |
| 2004/0035650 A1 | 2/2004 | Baumgartner et al. |
| 2004/0045776 A1 | 3/2004 | Baumgartner et al. |
| 2004/0050630 A1 | 3/2004 | Baumgartner et al. |
| 2004/0050635 A1 | 3/2004 | Bieker et al. |

FOREIGN PATENT DOCUMENTS

| | | |
|---|---|---|
| DE | 1655396 | 9/1972 |
| DE | 33 32 548 | 3/1985 |
| DE | 3610569 | 10/1987 |
| DE | 4212405 A1 | 10/1993 |
| DE | 4230830 * | 3/1994 |
| DE | 4430258 C1 | 1/1996 |
| DE | 29508001 U1 | 9/1996 |
| DE | 19515063 C1 | 2/1997 |
| DE | 19756519 | 10/1998 |
| DE | 3716202 | 11/1998 |
| DE | 19732168 | 1/1999 |
| DE | 19752543 | 6/1999 |
| DE | 19810685 | 11/1999 |
| DE | 19935934 | 2/2000 |
| DE | 10139903 | 4/2002 |
| EP | 0531321 | 3/1993 |
| EP | 0688404 | 12/1995 |
| EP | 0703133 | 3/1996 |
| EP | 0 942 191 | 9/1999 |
| EP | 0 995 923 | 4/2000 |
| FR | 1 547 063 | 11/1968 |
| GB | 939302 | 10/1963 |
| GB | 1156277 | 6/1969 |
| WO | WO 96/36819 | 11/1996 |
| WO | WO 97/22814 | 6/1997 |
| WO | WO 99/05428 | 2/1999 |
| WO | WO 99/06725 | 2/1999 |
| WO | WO 99/47409 | 9/1999 |
| WO | WO 99/60285 | 11/1999 |
| WO | WO 02/14125 A2 | 2/2002 |
| WO | WO 02/14126 A2 | 2/2002 |
| WO | WO 02/14127 A2 | 2/2002 |
| WO | WO 02/14707 A2 | 2/2002 |
| WO | WO 02/14708 A2 | 2/2002 |
| WO | WO 02/14710 | 2/2002 |
| WO | WO 02/14711 | 2/2002 |

* cited by examiner

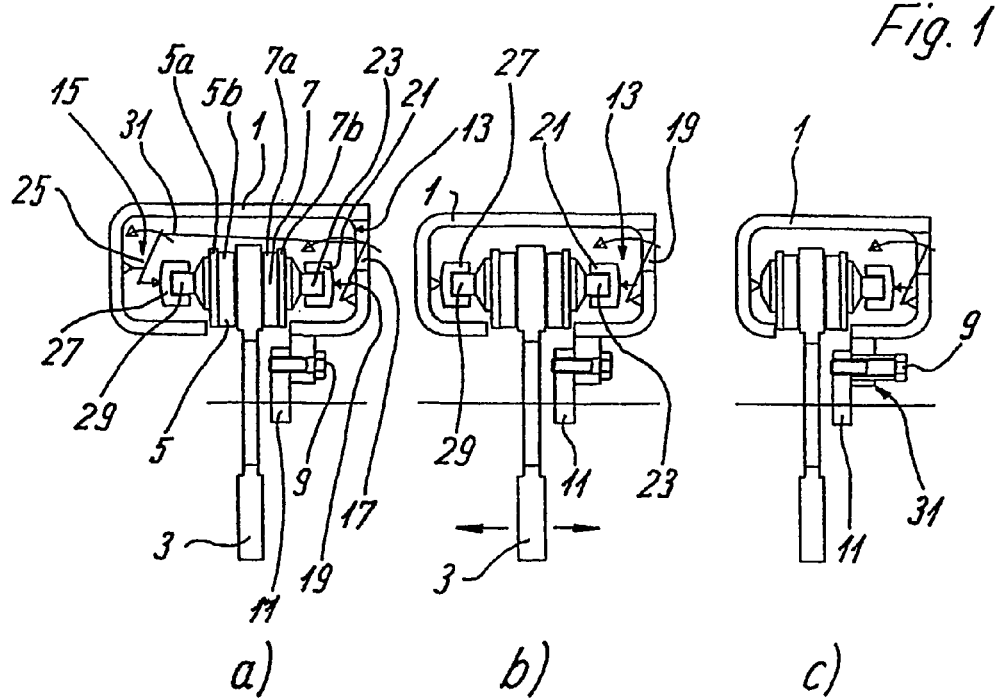
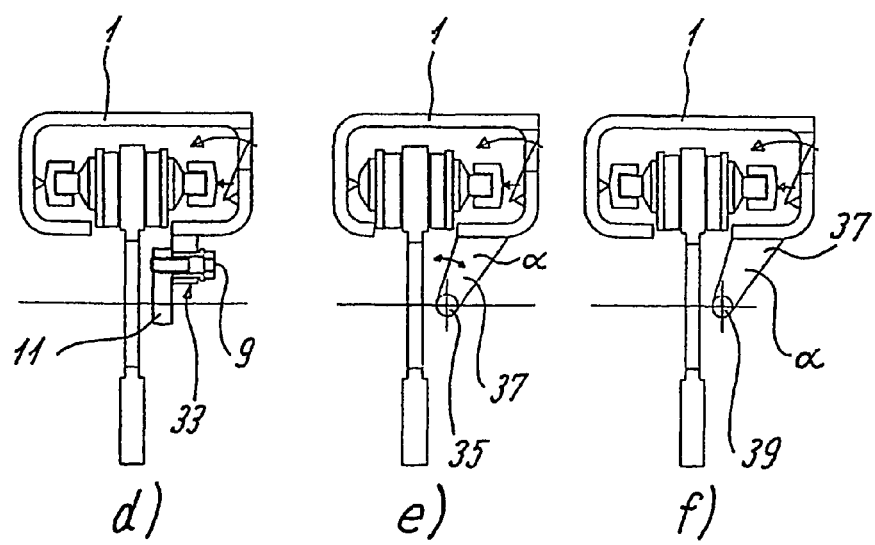
Fig. 1

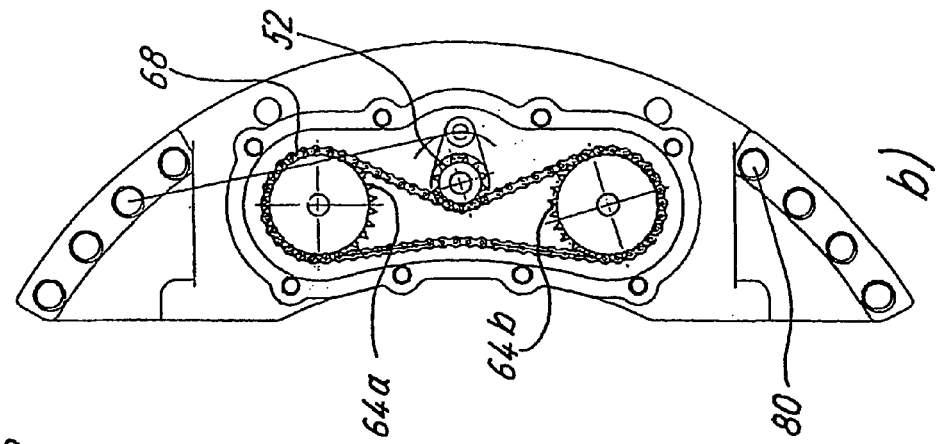
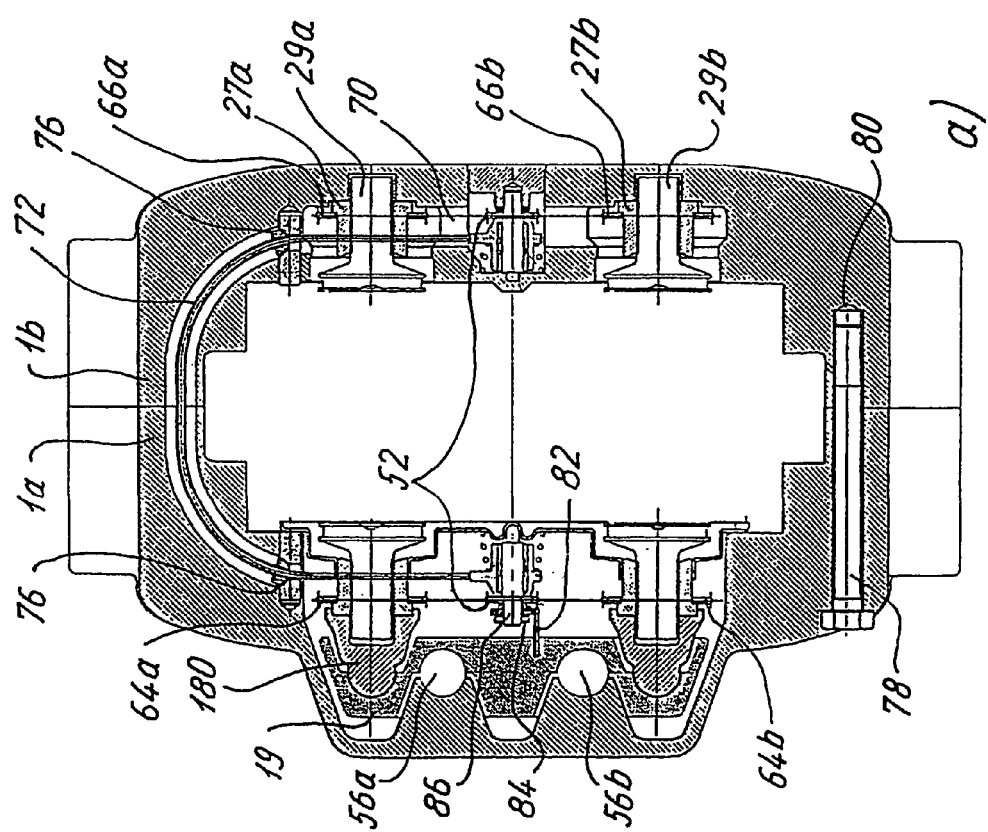
Fig. 3

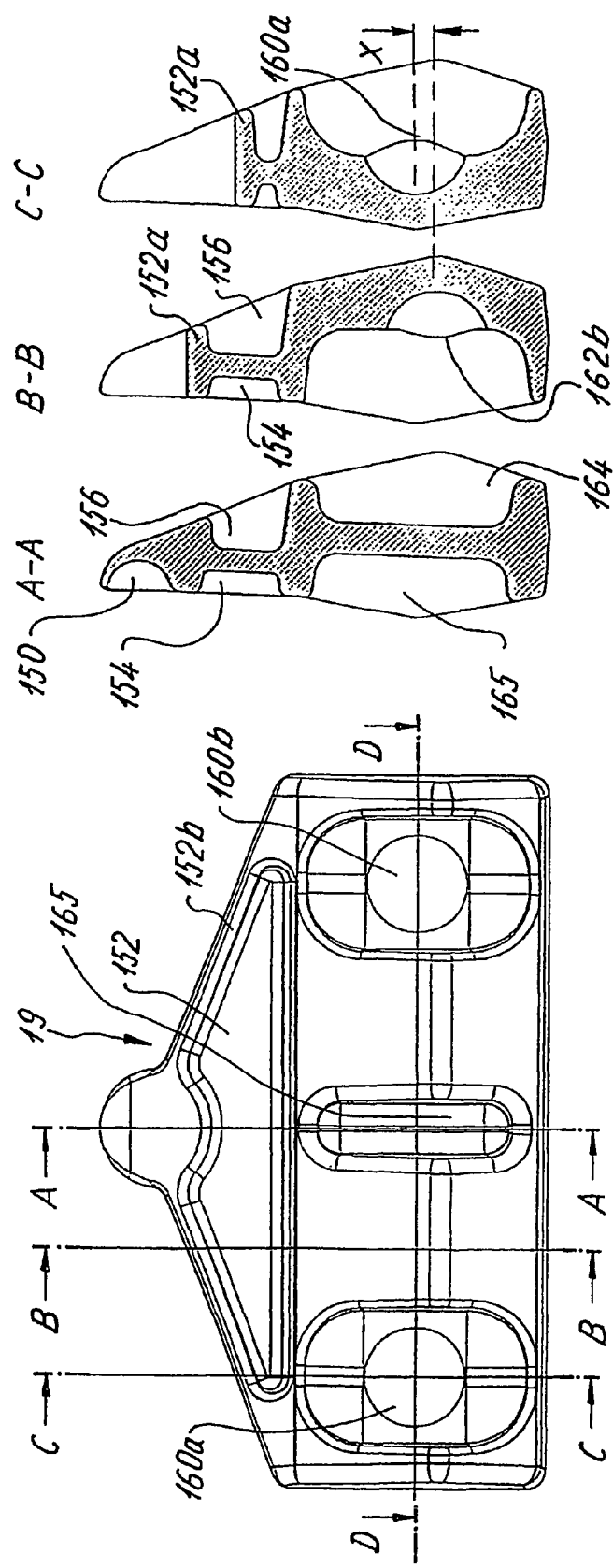
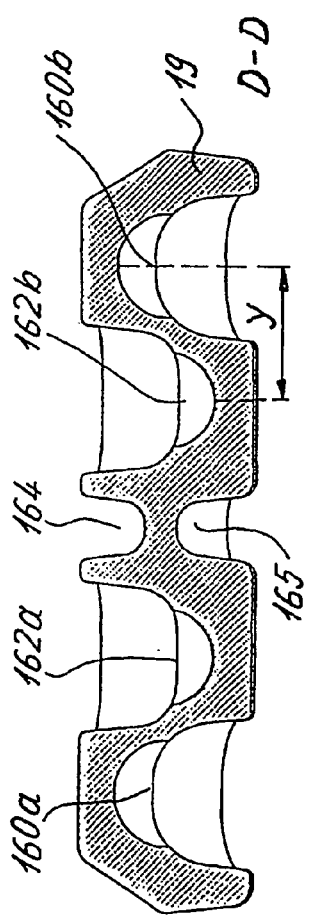
Fig. 10

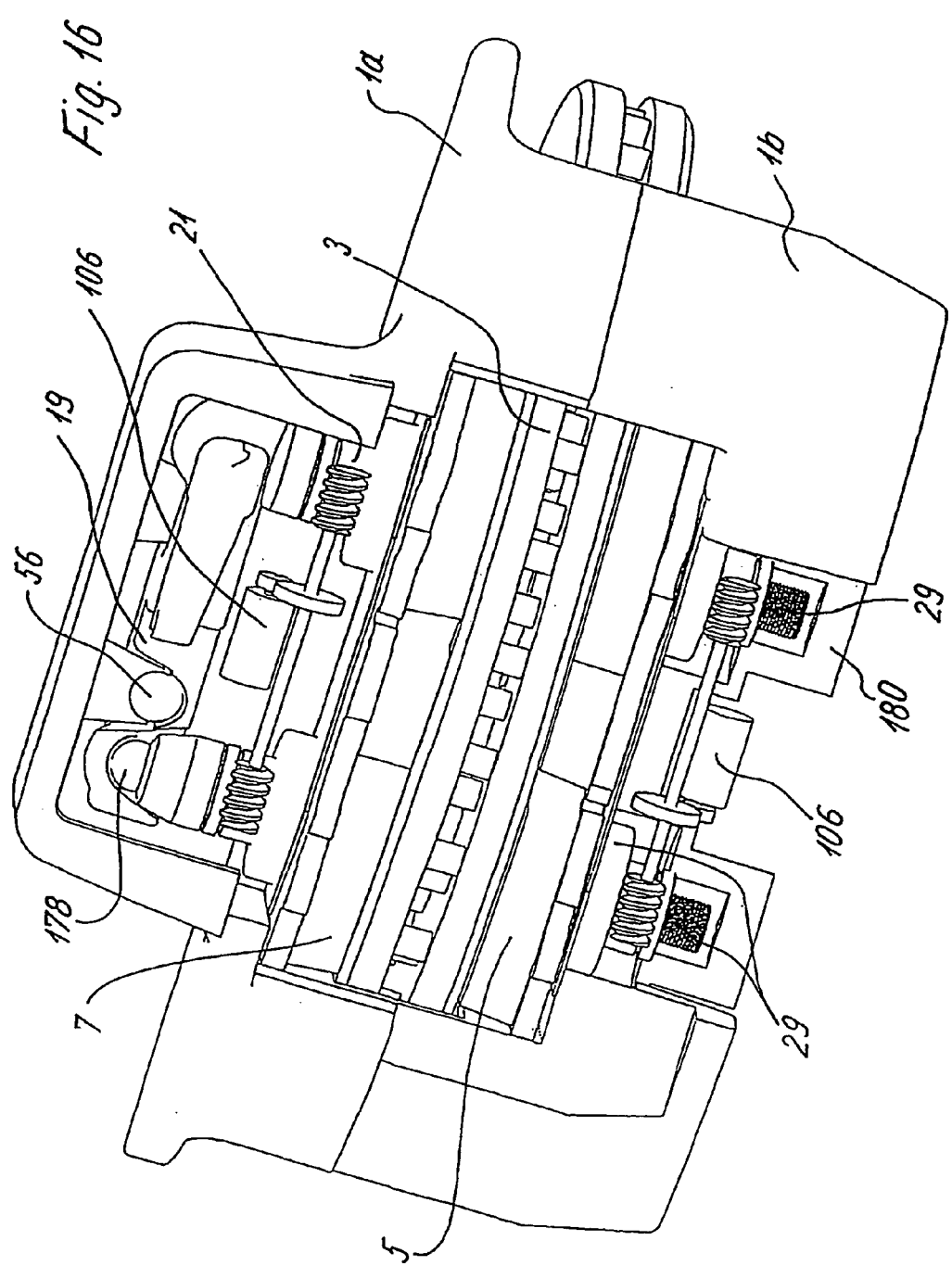

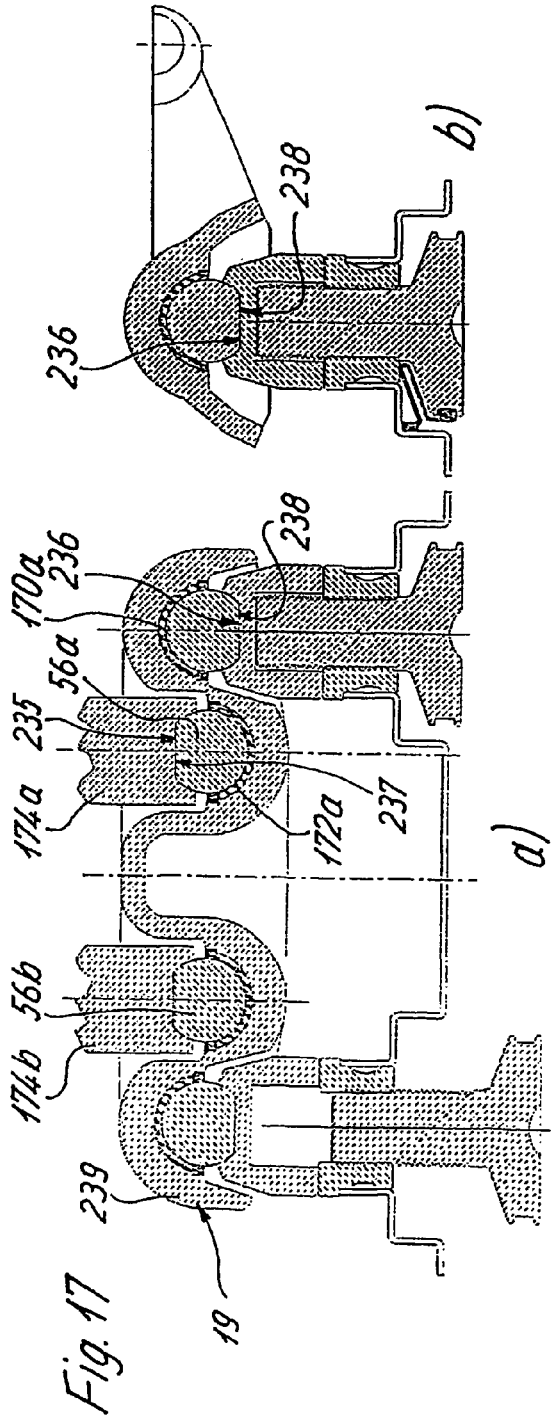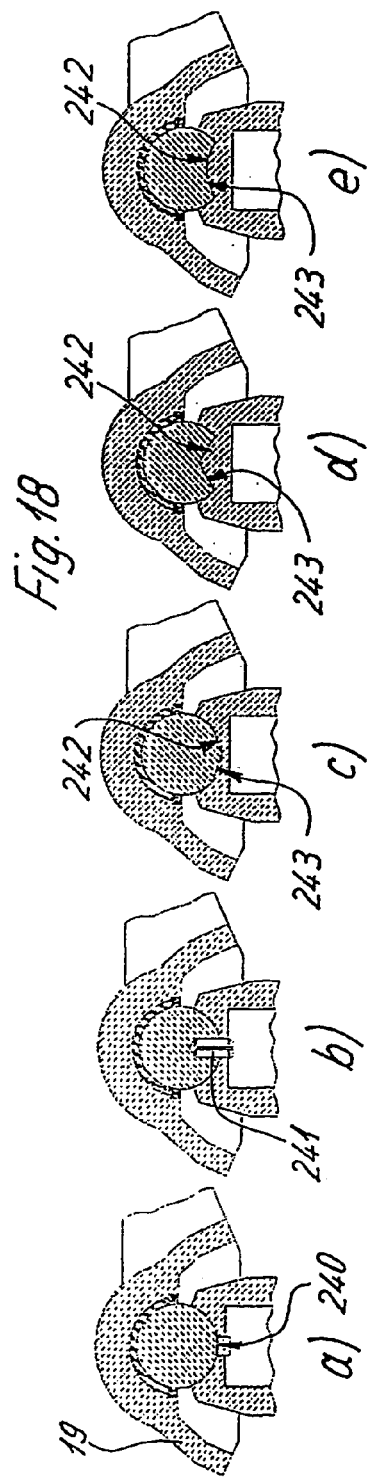

DISK BRAKE HAVING A BRAKE APPLICATION SYSTEM WITH A ROTARY LEVER

CROSS REFERENCE TO RELATED APPLICATION

This application is a continuation of application Ser. No. 10/344,764, filed Jul. 21, 2003 now U.S. Pat. No. 6,899,204.

BACKGROUND AND SUMMARY OF THE INVENTION

The invention relates to a disk brake, particularly for commercial vehicles, having a caliper reaching over a brake disk, a brake application device arranged in the caliper for the application of brake pads on both sides of the brake disk in the direction of the disk, as well as at least one adjusting system arranged in the caliper for compensating brake pad and/or disk wear by adjusting the distance between the brake pad and the brake disk. The adjusting system preferably has an adjuster device, particularly a rotary device. The application device arranged in the caliper has at least one rotary lever operable preferably by a rod, particularly a piston rod.

The invention particularly relates to novel constructions of disk brakes, particularly for commercial vehicles, which are actuated pneumatically and/or electromechanically.

According to the principle selected for introducing power, disk brakes can be divided into two basic designs:

1. The generation of power and the wear adjustment on both sides of the brake disk; for example, a hydraulic fixed caliper disk brake with a fixed brake disk relative to the axle, and the generation of power on both sides of the brake disk, and 2. the generation of power and the wear adjustment on one side of the brake disk and the transmission of the actuating power to the side which faces away, according to the reaction power principle; for example, a sliding caliper disk brake, a hinged caliper disk brake, or a fixed caliper disk brake with a slidable brake disk.

Pneumatically actuated disk brakes for heavy commercial vehicles with rim diameters of 15 inches or more normally use the reaction power principle because, as a result of the narrow installation conditions at the vehicle wheel, the arrangement of a pneumatic operating cylinder is only possible on the vehicle interior side of the wheel open toward the vehicle interior. Constructions of these types are shown, for example, in German Patent Document DE 36 10 569 A1, German Patent Document DE 37 16 202 A1, European Patent Document EP 0 531 321 A1 (see particularly the construction of the adjusters along the lines of rotary drives) and European Patent Document EP 0 688 404 A1.

Sliding caliper or hinged caliper disk brakes require a component which is fixed with respect to the axle—generally called a brake anchor plate (carrier)—which holds or guides the brake shoes/brake pads and, when the brake is actuated, absorbs their peripheral forces and carries the caliper which is slidably disposed coaxially to the vehicle axle.

The relative motion carried out by the caliper with respect to the component fixed relative to the axle can be divided into the working stroke and the wearing stroke. The invention makes surprising use of this effect.

The working stroke is carried out with each actuation of the brake in order to overcome the release play of the brake and to compensate for the elasticities of the brake pads and the caliper that result from the application of power. Depending on the extent of the actuating power and the amount of the release play, it is normally <4 mm.

In contrast, the wearing stroke is the wear adjusting travel which the caliper carries out over a large number of brake actuations in order to compensate for the wear on the reaction side of the brake. The wearing stroke is composed of the wear of the outside brake pad and the wear of the brake disk friction surfaces situated on the outside, and normally amounts to up to 25 mm.

In comparison, in the case of the brake design with a fixed caliper and a slidable brake disk, the working stroke and the wearing stroke are generated by sliding the brake disk.

The designs with the sliding caliper or hinged caliper have the disadvantage that the brake anchor plate, fixed relative to the axle, is required for absorbing the peripheral force of the brake pads and the holding and guiding of the caliper. This component results in additional cost and additional weight. Furthermore, the required sliding guidance or hinge system is susceptible to problems.

In the design with the slidable brake disk, in contrast, the problem is in maintaining easy slideability of the brake disk on the guiding area of the hub throughout the entire service life. An effective sealing-off can hardly be implemented because of the narrow installation conditions and the harsh environmental exposure.

It is known (for example, from European Patent Document EP 0 531 321) to provide the rotary lever 19 with an eccentric or eccentric section, which acts directly or by way of additional elements upon a traverse (cross-member) into which the thrust pieces are screwed.

It is also known to provide the rotary lever with lateral projections, which act upon the ends of the thrust pieces or on adjusting sleeves into which the thrust pieces are screwed (German Patent Document DE 36 10 569 A1).

Both concepts for the construction of the rotary lever are utilized. The lever has an approximately semicircular projection which, on the outer diameter, forms the slide-way for a roller bearing, in the interior of the respective semicircular projection, the eccentric is formed by means of a slide bearing half shell as well as a bearing roller accommodated therein.

Particularly in the case of the second described construction, this bearing arrangement makes it possible to keep the reaction forces of the eccentric bearing and of the outer roller bearing congruent in their position on the longitudinal axis of the lever.

As a result, it is possible to avoid bending stress or deformations on the lever as well as the resulting edge movement of the roller bearing and the slide bearing, which may clearly reduce the service life of the bearings.

Although in the case of the construction having a traverse, the deformation of the lever is reduced by means of the traverse, here also an increase of the service life is desirable, particularly by avoiding an edge movement.

A replacement of the roller bearing is also desirable on the side of the larger diameter of the eccentric projection of the rotary lever. The necessity to arrange the outer bearing shell as a semi-cylindrical projection in an enveloping manner around the eccentric necessarily leads to relatively large bearing diameters of the outer bearing. This results in the necessity of using a roller bearing on the outer bearing since, when a slide bearing is used, the higher resistances to friction in conjunction with the large friction diameters may lead to friction losses and application force losses and, as a result, to an undesirably high brake hysteresis.

With respect to eccentric-operated disk brakes, it should be mentioned that the prior art also includes German Patent Document DE 44 30 258 C1, International Patent Document WO97/22814 and German Patent Document DE 295 08 001 U1.

The disk brake of the construction of this type, particularly its brake application device, is to be optimized in that an extensive use of slide bearings with small friction diameters is achieved while the deformations of the rotary lever are simultaneously minimized.

The invention achieves this task by means of the claimed objects.

According to the invention, the construction of the brake application device per se is particularly simplified. The invention is suitable for calipers of many different constructions, such as sliding and hinged calipers but also for fixed calipers or (micro)-deformable calipers.

Accordingly, the rotary lever has a recess for receiving the end of the piston rod on one of its ends, and has recesses on its end area facing away from the recess on two of its exterior sides, into which recesses essentially cup-shaped bearing shells and/or essentially spherical bearing elements for bearing the rotary lever can be inserted, by means of which the rotary lever is disposed on the caliper and on at least one thrust piece for displacing the brake pad in the direction of the brake disk.

The rotary lever is thereby constructed as a traverse-type structural member, which makes the use of a traverse (cross-member) separate from the rotary lever unnecessary. The spherical bearing elements, which can be disposed in the slide bearing shells permit a durable stable bearing of the rotary lever and an overall compact cost-effective construction of the brake application device.

In a constructively simple manner, the rotary lever is directly, or by way of additional intermediately connected elements, disposed on the caliper—lever bearing—and directly, or by way of additional intermediately connected elements, disposed on the at least one thrust piece—eccentric bearing—.

The bearing shells are expediently constructed at reasonable cost as slide bearing shells.

Advantageously, the spherical bearing elements are arranged on the traverse-shaped section of the rotary lever on opposite sides with an opposed pressure direction.

Particularly preferably, the spherical bearing elements are arranged with their ball centers in the longitudinal direction of the traverse-type section—and thus perpendicular to the lever arm A—A—parallel to the brake disk as well as transversely to this longitudinal direction in a mutually spaced manner.

Advantageously, the mutually opposite spherical bearing elements or bearing balls of the lever and eccentric bearings are each arranged in the traverse-type section of the rotary lever such that the ball centers are situated almost or completely on a connection plane with the pivot of the operation on the lever arm. In particular, a compact arrangement of the ball elements of the bearing of the rotary lever is achieved thereby.

Expediently, the position of the eccentric bearing for achieving a defined change of the transmission ratio as a function of the lever position is offset by a given amount from the connection plane of the center of the lever operation to the lever bearing centers.

The slide bearing shells are preferably arranged in the rotary lever, or in the part of the caliper or the intermediate pieces which face away in each case, or on both sides of the spherical bearing elements or bearing balls, so that the bearing of the rotary lever takes place exclusively via slide bearings and bearing balls inserted into the slide bearings.

The lever cup advantageously has a toroidal shape.

Advantageously, the lever cup has a larger cup diameter in the swivelling direction than transversely to this swivelling direction.

When the brake is designed with, in each case, only one thrust piece or only one adjusting rotary drive on one or both sides of the brake disk, the rotary lever is advantageously and constructively favorably provided with two lever bearings at the ends of the traverse-type section and with only one eccentric bearing in the center.

Preferably, the essentially spherical bearing elements and their receiving devices have mutually corresponding devices for protecting against torsion, which devices are constructed as a butt-welded or friction-welded seat or, for example, as a dowel pin or spring dowel sleeve.

Expediently, the essentially spherical bearing elements and their receiving devices have, as a device for protecting against torsion, on their sides pointing toward one another, mutually corresponding torsion-proof geometrical shapes or, on their sides pointing toward one another, mutually corresponding flattenings and/or indentations and projections.

The indentations/projections expediently have concave/convex or ball-cup-shaped constructions.

Preferably, in each case, at least one of the adjuster rotary devices is provided on each side of the brake disk for adjusting the axial distances between the two brake pads and the brake disk.

Furthermore, preferably the generating of the reaction power on the side of the brake facing away from the application side is carried out by the sliding of the caliper and/or the swivelling of the caliper and/or the sliding of the brake disk.

In each case, as the result of the sliding and/or swivelling motion, essentially only the length of the power stroke can be bridged.

The invention combines the advantages of the fixed-caliper principle—such as compact construction and implementation of the wearing stroke by the actuating system—with the advantages of the reaction power principle.

As a result of the additional adjusting device(s) on both sides of the disk brake, it is permitted to further develop the brake such that only a mobility, preferably a slidability and/or a swivellability of the caliper and/or the brake disk have to be ensured, which is dimensioned such that the working stroke during brakings can be bridged in order to apply the brake. In this manner, the sliding and/or rotary bearings and guides can be dimensioned to be correspondingly smaller and less expensive. Additionally, it is ensured that a smooth running takes place along the complete sliding or swivelling path since the latter is bridged during virtually every braking.

The brake disk is preferably constructed as a sliding disk which is slidably guided on a brake disk hub such that, as a result of the sliding, (only) a sliding path can be implemented which is limited to the power stroke.

As an alternative or in addition, the caliper can be constructed as a sliding caliper, which has a sliding caliper bearing which can be fastened directly to the axle flange and which is dimensioned such that (only) a sliding path can be bridged which is limited to the power stroke.

As an alternative or in addition, the caliper may be constructed as a hinged caliper which has a hinged caliper bearing, which preferably can be fastened directly to the axle flange and can be bridged by means of the swivelling angle which displaces the caliper relative to the brake disk essentially by the amount of the power stroke.

In particular, the disk brake according to the invention makes it possible to continue to arrange the power generating device—such as a pneumatically actuated and/or electric-motor-actuated brake cylinder or an electric drive—only on one side on the brake.

Additional advantages are achieved within the scope of the invention.

A variant, which can also be considered independently, of the invention solves the problem of the joint adjustment of the adjustable rotary drives on both sides of the disk brake. Here, the adjustable rotary drives on both sides of the brake disk are mutually coupled by means of a synchronizing device. The synchronizing device is preferably constructed as a coupling mechanism or as an electronic coupling system.

According to another variant, which can also be considered independently, of the invention, the adjusting system itself is further improved. This variant, in the case of which a particularly space-saving adjusting module is created, which can be produced particularly economically, is suitable for brakes of a conventional construction as well as for brakes of the type claimed.

According to another claim, the adjusting system on one or both sides of the brake disk is constructed as an adjuster module, which can be preassembled and which has at least
  preferably an electric motor as the drive,
  a reduction gear connected behind the electric motor, which can be mounted jointly on a mounting preform, particularly a mounting plate or preferably between two mutually spaced mounting preforms, and
  wherein the rotary drive(s) are inserted on/in the at least one mounting preform(s).

BRIEF DESCRIPTION OF THE DRAWINGS

In the following, embodiments of the invention are explained in detail with reference to the drawings.

FIGS. 1*a–f* are section-type schematic diagrams of different types of disk brakes;

FIGS. 3*a, b* are two partial sectional views perpendicular and parallel to the brake disk of a third embodiment of a disk brake according to the invention;

FIG. 10 is a top view and four sectional views of the rotary lever of the type of FIG. 9;

FIG. 16 is a perspective view of another disk brake;

FIGS. 17–9 are sectional views of variations of the arrangement of bearing balls at the rotary lever and on the adjoining structural members;

DETAILED DESCRIPTION OF THE DRAWINGS

Figure 2:
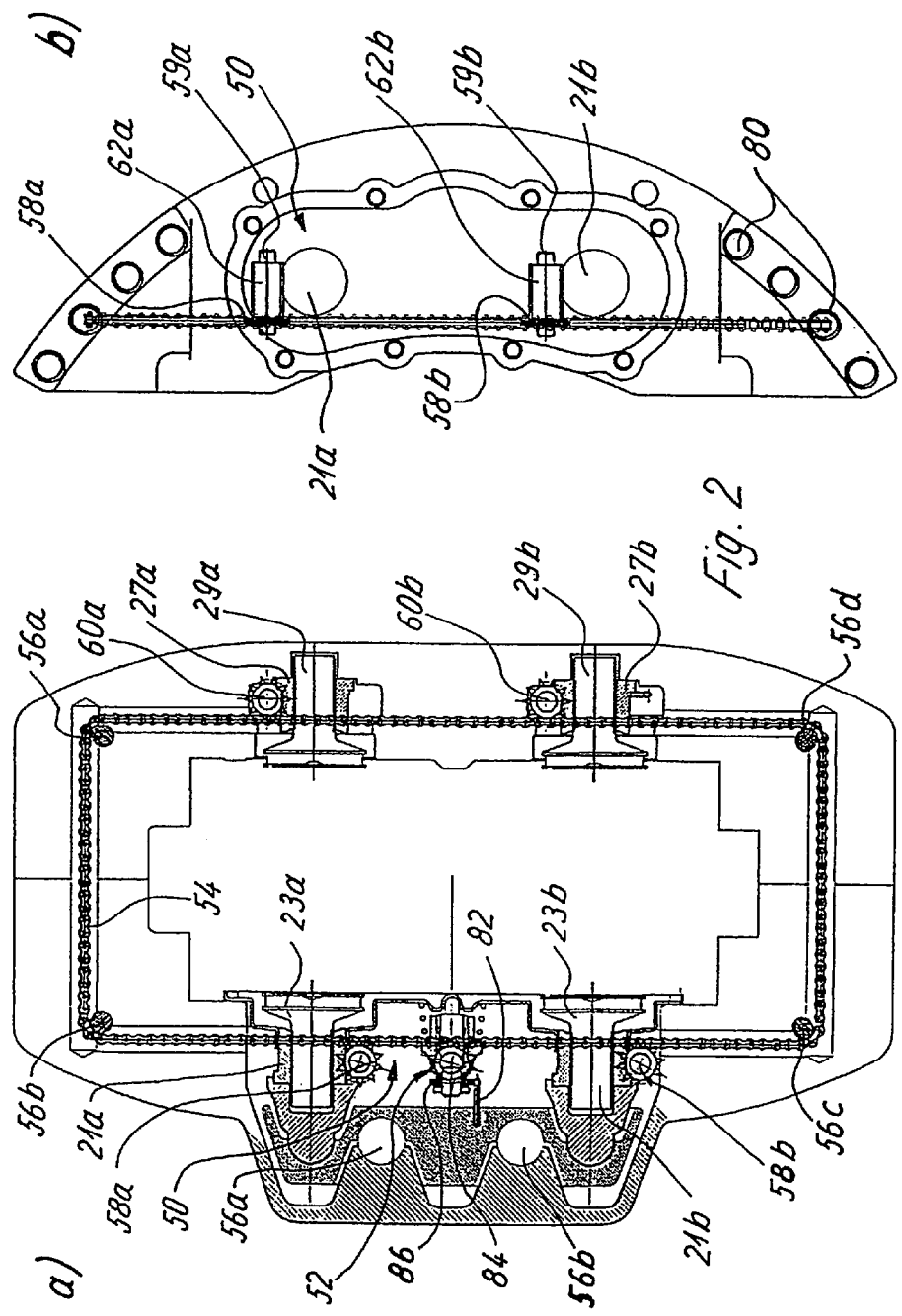
FIGS. 2*a,b* are two partial sectional views perpendicular and parallel to the brake disk of a second embodiment of a disk brake according to the invention.

FIG. 1*a* illustrates a disk brake which has a caliper 1 straddling a brake disk 3 in the disk's upper peripheral area. Brake pads 5, 7 are arranged on both sides of the brake disk 3, which brake pads 5, 7 can be slid in the direction of the brake disk and away from it, that is, perpendicular to the plane of the brake disk 3, and, in a conventional manner, consist of a brake pad carrier 5*a*, 7*a* and the pad (friction) material 5*b*, 7*b* mounted thereon.

On one side of the brake disk (on the right in FIG. 1*a*), the caliper 1 can be fastened in its lower section, which lower section extends essentially inward toward the brake disk and perpendicular thereto, by means of at least one or several bolts 9, either directly to the axle flange 11 of the vehicle axle (otherwise not shown here) or, by way of an intermediate flange (not shown here), to the axle flange 11.

The caliper 1 is stationary relative to the axle flange 11; it is therefore a so-called "fixed caliper". Since the caliper 1 cannot be slid relative to the axle flange, it requires application devices 13, 15 on both sides of the brake disk 13 for the application (and release) of the brake pads 5, 7 in the direction of the brake disk 3.

Figure 20A:
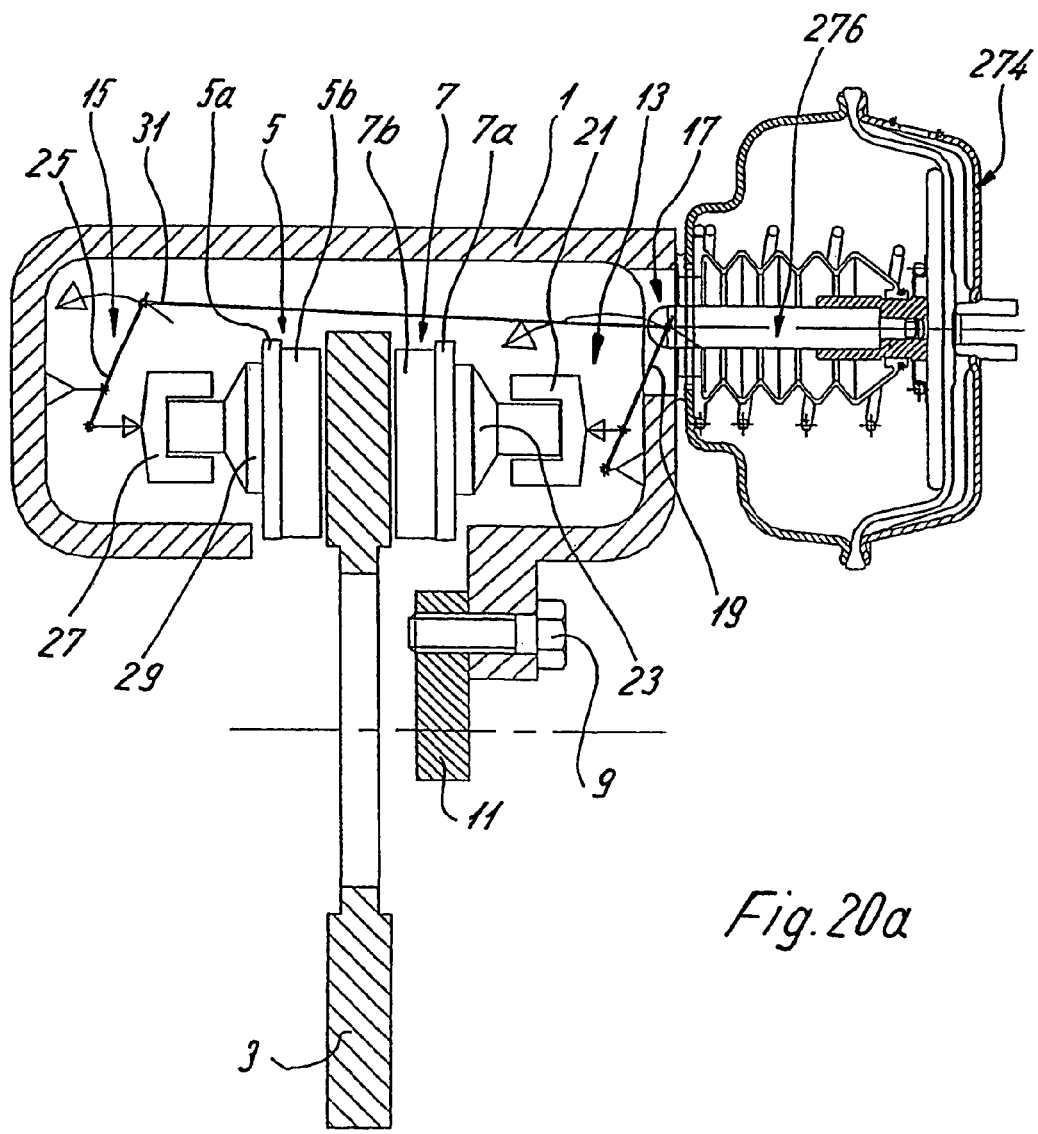
FIGS. 20*a–f* are additional section-type schematic diagrams of the disk brakes of FIG. 1.

On its upper side, which is on the right in FIG. 1*a*, the caliper has an opening for a piston rod (not shown here) of a brake cylinder (which is also not shown here and is preferably pneumatic) or an electromechanical driving mechanism (see also FIG. 20*a*).

The piston rod acts upon a rotary lever 19 which is—preferably eccentrically—disposed on the caliper 1 and is designed (directly by way of corresponding projections or optionally by way of additional structural members which are not shown here but are indicated as examples in the additional figures) for advancing, by means of at least one rotary adjusting device of an adjusting sleeve 21, in which a thrust piece is screwably arranged, a brake pad 7—here, on the right—in the direction of the brake disk 3.

A restoring spring (not shown in FIG. 1) may be used for returning the brake pad.

Since the brake disk 3 as well as the caliper 1 are fixedly or stationarily arranged relative to the vehicle axle, the additional application device 15 is provided on the side of the brake disk 3 situated opposite the first brake application device 13.

This additional application device 15 provided on the left side of the brake disk 3 in FIG. 1*a* is constructed analogous to the application device 13; that is, it also has a rotary lever 25 which is preferably disposed eccentrically on the interior side of the caliper 1, and which is designed (directly by way of corresponding projections or optionally by way of additional structural members which are not shown here but are indicated as examples in the additional figures) for advancing, by means of at least one adjusting sleeve 27, in which a thrust piece 29 is screwably arranged, the second brake pad 5—here, on the left—in the direction of the brake disk 3. The rotary lever 25 has an eccentricity which is opposite to the eccentricity of the rotary lever 19.

The two rotary levers are directly connected with one another by means of a coupling mechanism, which is constructed here as a bolt 31 coupled in an articulated manner to the upper ends of the rotary levers 19, 25 and connecting the latter with one another. The two rotary levers 19, 25 therefore move synchronously with respect to one another.

In contrast to the state of the art according to FIG. 1*c*, in FIG. 1*a*, separate application devices 13, 15 are therefore provided in each case on both sides of the brake disk, which application devices 13, 15 can be jointly operated by means of the coupling mechanism.

Figure 28:
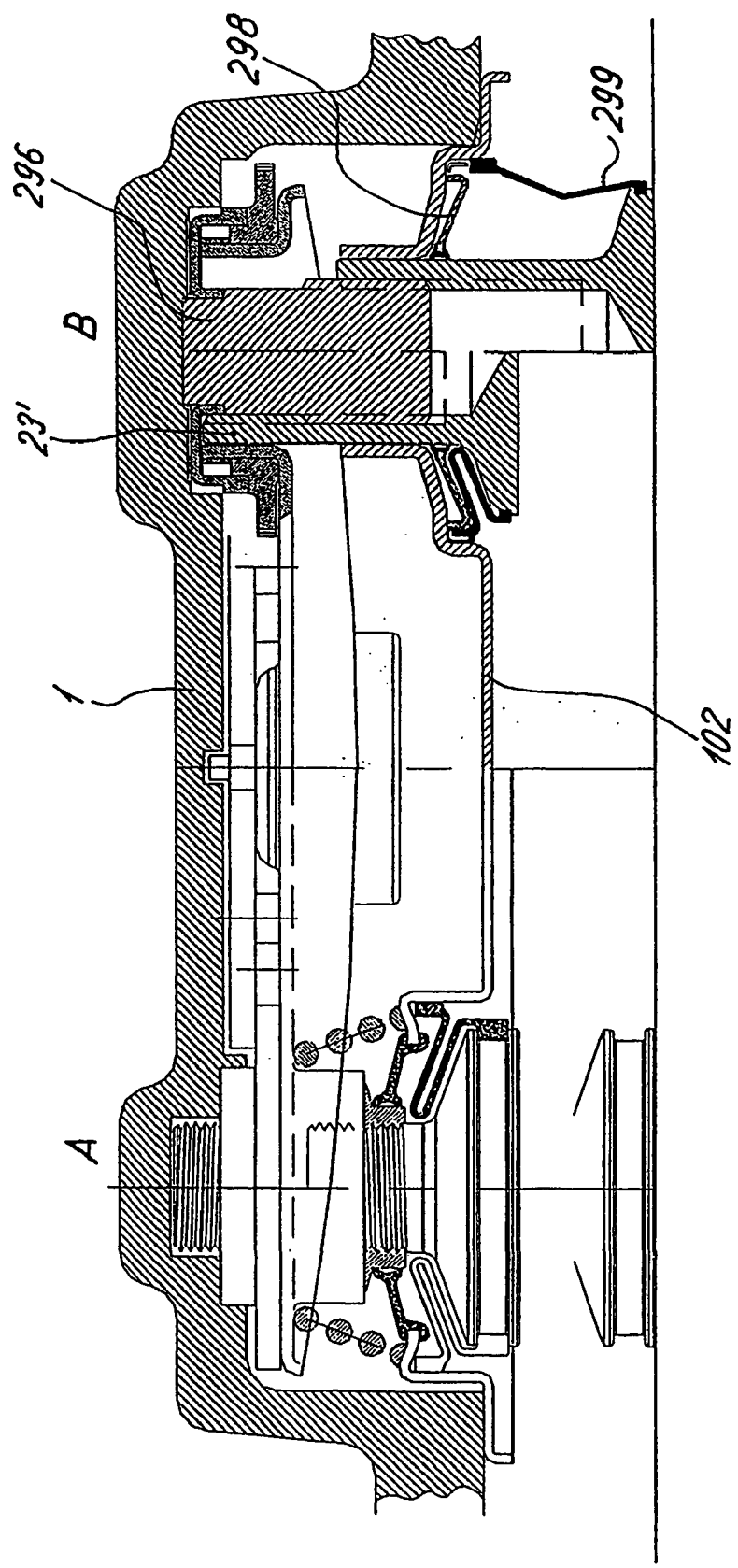
FIG. 28 is a partial cross-sectional view of an adjusting mechanism.

An analogous situation exists with respect to the adjusting system of the disk brake of FIG. 1*a*. The adjusting system of this brake has adjusting devices arranged on both sides of the disk brake. These adjusting devices comprise the mutually screwed-together and therefore also mutually axially adjustable adjusting sleeves 21, 27 and thrust pieces 23, 29, as well as preferably separate adjuster devices (see the additional figures) on both sides of the brake disk 3. As an alternative to the rotary adjusting devices, repositionable pistons or other repositionable devices can also be implemented. As an alternative—see FIG. 28—the thrust pieces 23' and 29' may be provided with a sleeve-type projection 294 which meshes on one side with a bolt 296 provided with an external thread, which bolt 296 is supported at the rotary lever 19 or at the caliper or at another element. The thrust pieces are preferably sealed off twice with respect to the mounting and closing plate 102 (seals 298, 299). It is important that the pressure pieces are constructed to be movable in the direction of the brake disk.

The embodiments of FIGS. 1*b*, 1*d* and 1*f* differ from the embodiment of FIG. 1*a* in that the caliper has an application device 13 in each case only on one side of the brake disk 3, the generating of the reaction power taking place on the side of the brake facing away from the actuating device by a sliding or swivelling of the caliper 1 and/or by the sliding of the brake disk 3. The wear adjustment on the reaction side, however, is not implemented according to the state of the art (FIG. 1*c* and FIG. 1*e*) by sliding or swivelling the caliper or by sliding the brake disk but, as in FIG. 1*a*, by means of an adjusting device integrated in the caliper on the reaction side. According to FIGS. 20*g* and *h*, the generation of the reaction power can be achieved by an elastic deformation of the caliper, the brake disk or of a separate element 292.

In addition to a clear reduction of weight and cost by the elimination of the brake anchor plate (carrier) and of the sliding guidance system of a sliding caliper, as well as an increase in the robustness by the elimination of these structural members, disk brakes constructed in this manner have the advantage that, because of the compulsory wear adjustment, a greater influence can be exercised on a nonuniform wear of the inner and outer brake pads.

Another important advantage of these variants is that the sliding or swivelling travel to be carried out by the caliper 1 and/or the brake disk 3 is limited to the power stroke required for the application of the reaction power, which power stroke amounts to only a small fraction of the wearing stroke; for example, the required power stroke of a pneumatically actuated disk brake for 22-inch wheels amounts to approximately 4 mm, while the wearing stroke amounts to approximately 25 mm.

Like the embodiment of FIG. 1*a*, the embodiment of FIG. 1*b* has adjusting devices arranged on both sides of the disk brake. These again comprise the adjusting sleeves 21, 27 and the thrust pieces 23, 29, which can be screwed to one another and can therefore also be axially adjusted relative to one another, as well as preferably also separate adjuster drives (see the additional figures) on both sides of the brake disk 3.

However, in contrast to FIG. 1*a*, the disk brake of FIG. 1*b* only has a brake application device 13 on one side of the brake disk 3 (here, on the right side), which clearly reduces the costs of this variant in comparison to that of FIG. 1*a* since structural members (among others, the rotary lever 25) can be eliminated on the opposite of the brake disk. Instead, it becomes possible to arrange the adjusting sleeve 27 axially but rotatably in a stationary manner on the interior side of the caliper (back of caliper) and, for adjusting the brake pad wear on this side of the brake disk 3, to screw the thrust piece 29 relative to the axially fixed adjusting sleeve 27, so that the axial position of the thrust piece 29 is changed relative to the brake disk 3.

The caliper 1 of the embodiment according to FIG. 1*b* is, in turn, constructed like the caliper 1 of the embodiment of FIG. 1*a* as a fixed caliper.

Another characteristic feature of the embodiment according to FIG. 1*b* is the slidability of the brake disk 3 relative to the wheel axle. For this purpose, the brake disk is preferably provided with a toothing in the area of its hub (not shown here) which is constructed such that a sliding path of, for example, <2 mm can be implemented which is limited to the power stroke.

Slidable brake disks are known per se. A significant difference with respect to the known sliding disk principle, which requires a wearing path of, for example, 25 mm, as the sliding path, consists of the fact that the brake disk 3 of the brake according to FIG. 1*b* has a sliding path constantly in the range of the brake's working stroke of <2 mm, so that the working stroke sliding path between the brake disk hub and the actual brake disk 3 is kept free of frictional corrosion formations and contamination by the constant movement during the actuation of the brake, by vibration, etc. The brake disk 3 therefore remains constantly easily slidable in the range of its working stroke.

In addition, the small sliding range can be provided with protective measures against the formation of corrosion and against contamination relatively easily.

In comparison, a conventional sliding brake disk gradually changes its working position within the sliding range of, for example, 25 mm as wear increases. The sliding range not constantly used therefore becomes sluggish over time as a result of corrosion and contamination, which may seriously impair the operation of the brake. Moreover, the relatively large sliding range can be provided with protective measures only at high expenditures. These problems do not occur in the case of the inventive solution according to FIG. 1*b*.

FIG. 1*c* shows the state of the art of a sliding caliper, in the case of which the caliper 1 is constructed as a sliding caliper with a caliper bearing which is slidable along the path of the power stroke relative to the brake disk, the wheel axle or the brake anchor plate (not shown here) conventionally provided in the case of sliding caliper disk brakes. The application of the brake pad 5 situated opposite the application device 3 takes place on the other side of the brake disk 34 by a reaction-power-caused sliding of the caliper, an adjusting device being provided only on one side of the brake disk, specifically on the side of the application device 13.

Here, the embodiment of FIG. 1*d* uses a different approach. The construction of the braking mechanism in the interior of the caliper 1 corresponds to that of the embodiment according to FIG. 1*b*. However, in this case, in contrast to FIG. 1*b*, not the brake disk but the caliper is "microslidable", that is, essentially only by the amount of half the working stroke (<2 mm) but not by the amount of the wear adjusting path. This means that the sliding path of the caliper bearing 33 is only as large as the maximal working stroke and typically amounts to less than 5 mm, for example, 2 to 4 mm.

In order to implement this, the disk brake of FIG. 1*d*, like the disk brake of FIG. 1*b*, has separate adjusting devices (here, elements 21, 23 and 27, 29) on both sides of the brake disk 3.

Naturally, a combination of the embodiments according to FIGS. 1*b* and 1*d* can also be implemented; thus, a disk brake with a caliper bearing and a slidable brake disk which can, in each case, be slid by approximately half the working stroke. This embodiment is also provided with separate adjusting devices on both sides of the brake disk 3.

FIG. 1*e* shows a so-called "hinged caliper" disk brake, where the caliper is swivellable by a defined angle disposed on the brake anchor plate or an axle part (pivot bearing 35 with a strut connection 37 to the actual hinged caliper 1).

According to FIG. 1*e*, this swivelling angle α is selected to be so large that the entire wear adjusting path can be bridged during the swivelling of the caliper.

In this variant, the basic construction of the application mechanism in the interior of the caliper again corresponds to the application mechanism of FIG. 1*c*.

In contrast, FIG. 1*f* shows a disk brake with a swivellable caliper 1, which again has a pivot bearing 39. However, the "hinged caliper", which is disposed on the pivot bearing by way of the strut connection 37, can be swivelled only by an angle α large enough that the brake pads can be swivelled by half of the length of the working stroke relative to the brake disk 3. This disk brake also again has an application device only on one side of the brake disk but has at least one adjusting device on both sides of the brake disk.

Naturally, a combination of the embodiments according to FIGS. 1*b* and 1*f* can also be implemented; thus, a combination of a disk brake with a swivellable caliper and a slidable brake disk. This embodiment is also equipped with separate adjusting devices on both sides of the brake disk 3. In the latter case, the required sliding path in the power stroke can be distributed to the caliper 1 and the brake disk 3.

It should be noted that the invention is suitable for disk brakes, particularly commercial vehicle disk brakes, of many different types. Thus, the idea of providing adjusting devices on both sides of the brake disk can be implemented in the case of brakes which can be applied by an electric motor as well as in the case of pneumatically actuated brakes. Furthermore, the adjusting devices may be coupled with the drive of the brake application device(s) on one or both sides of the brake disk and/or may be provided independently of the application devices with one or several separate electromagnetic drive(s). Here, mixed constructions are also contemplated, for example, with an adjusting device having an electric motor on the reaction side and with an adjusting device mechanically coupled with the rotary lever on the side of the brake application device.

In addition, it is possible to adjust the adjusting rotary devices on both sides of the brake disk 3 by means of a computer and/or microprocessor control separately from one another or, for achieving a joint adjustment, to carry out a mechanical coupling of the adjusting devices on both sides of the brake disk 3.

The forced restoring of the respective slidable or swivellable element—caliper or brake disk—can be carried out by elastic restoring elements (for example, restoring spring(s)) or an active restoring can be carried out by the reaction-side adjuster module.

In addition, the invention is suitable for brakes with only a single adjusting drive on each side of the brake disk as well as for embodiments with two or even more adjusting drives on each side of the adjusting device.

Figure 20B:
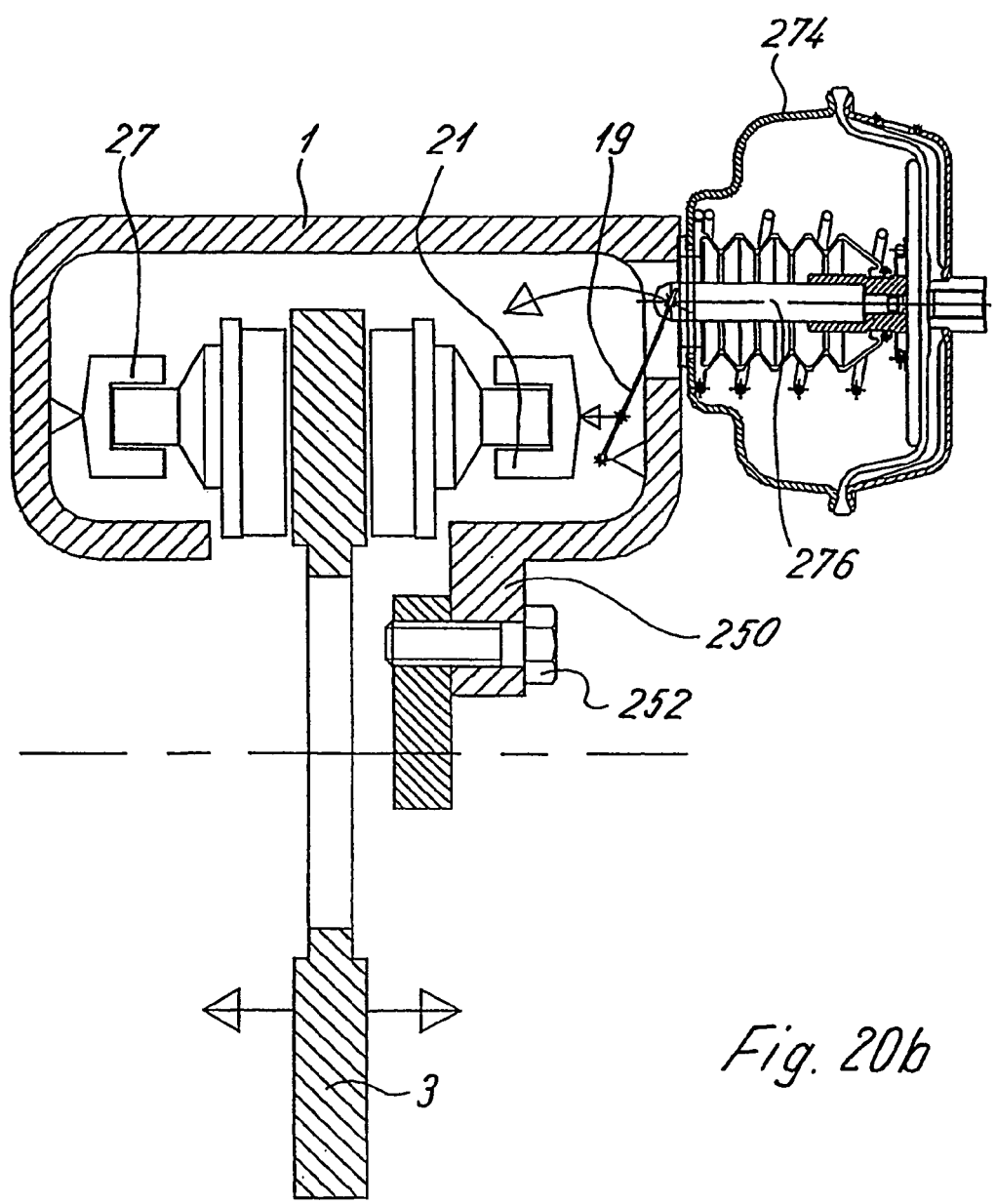
Figure 20C:
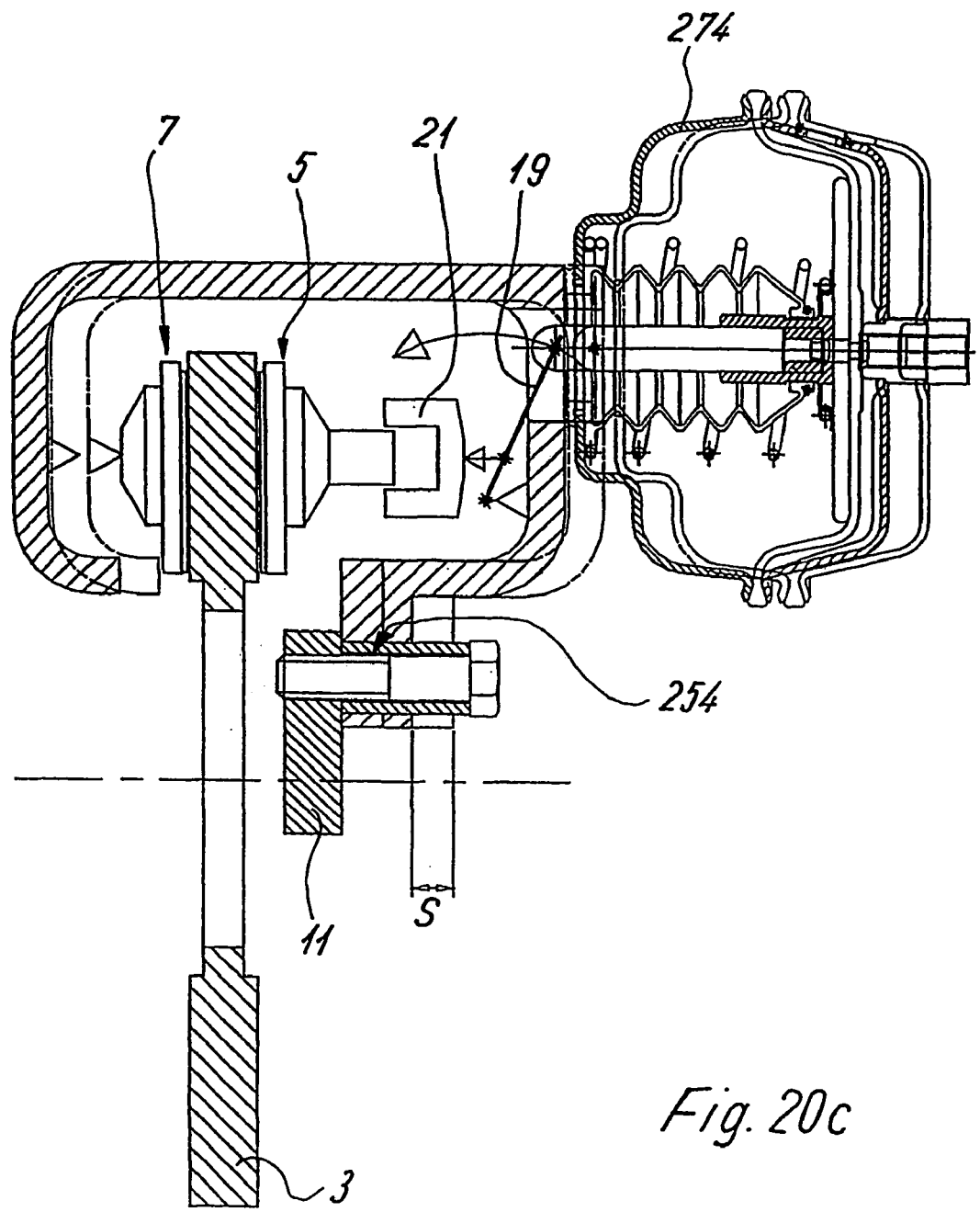
Figure 20D:
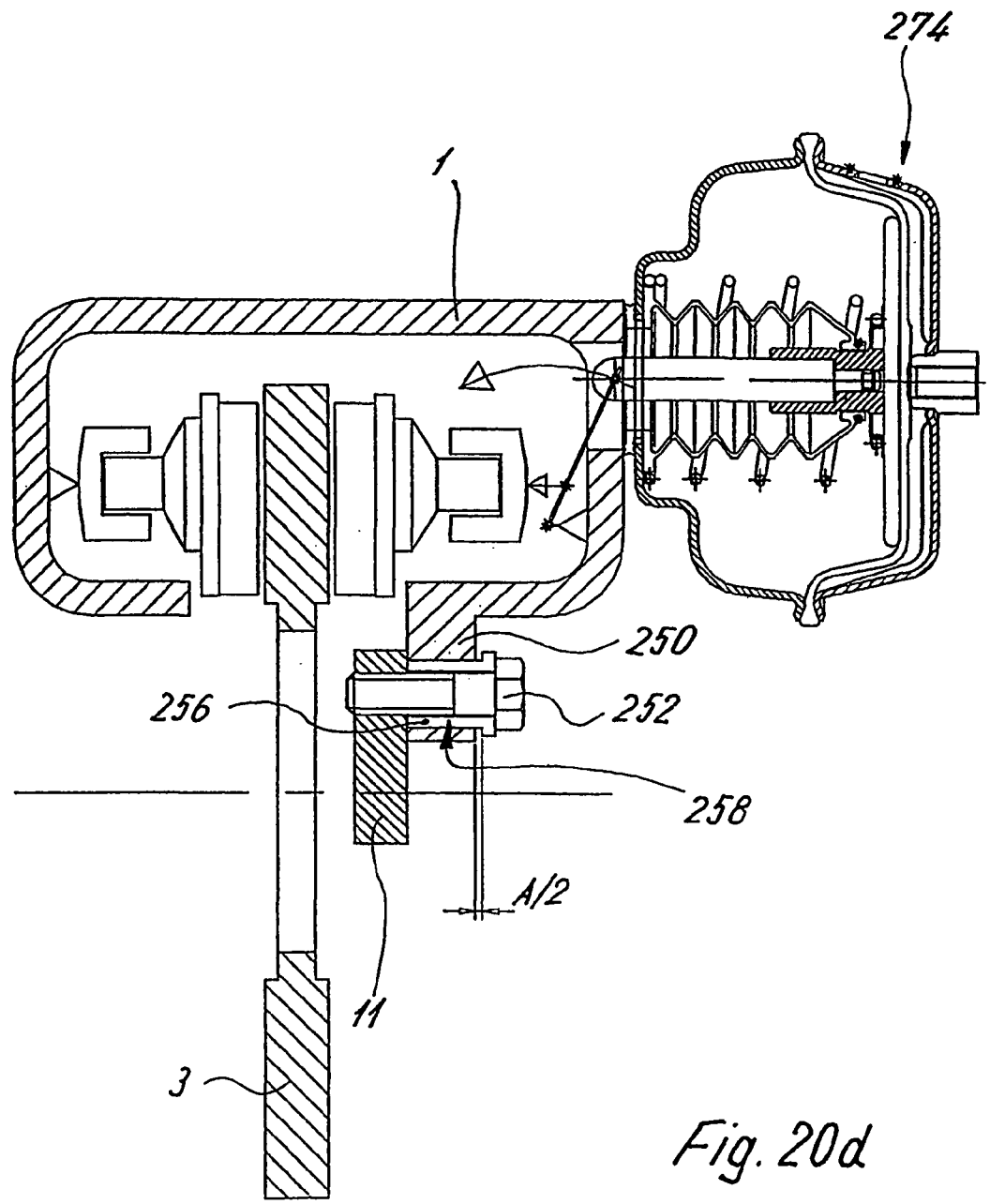
Figure 20F:
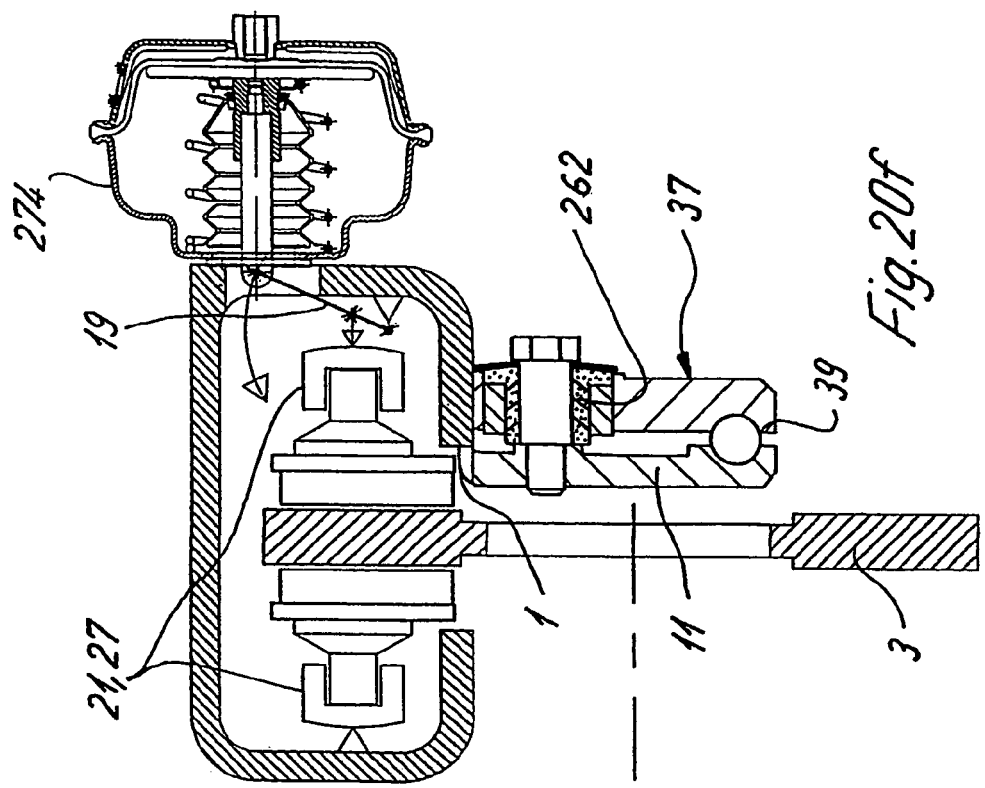
Figure 20E:
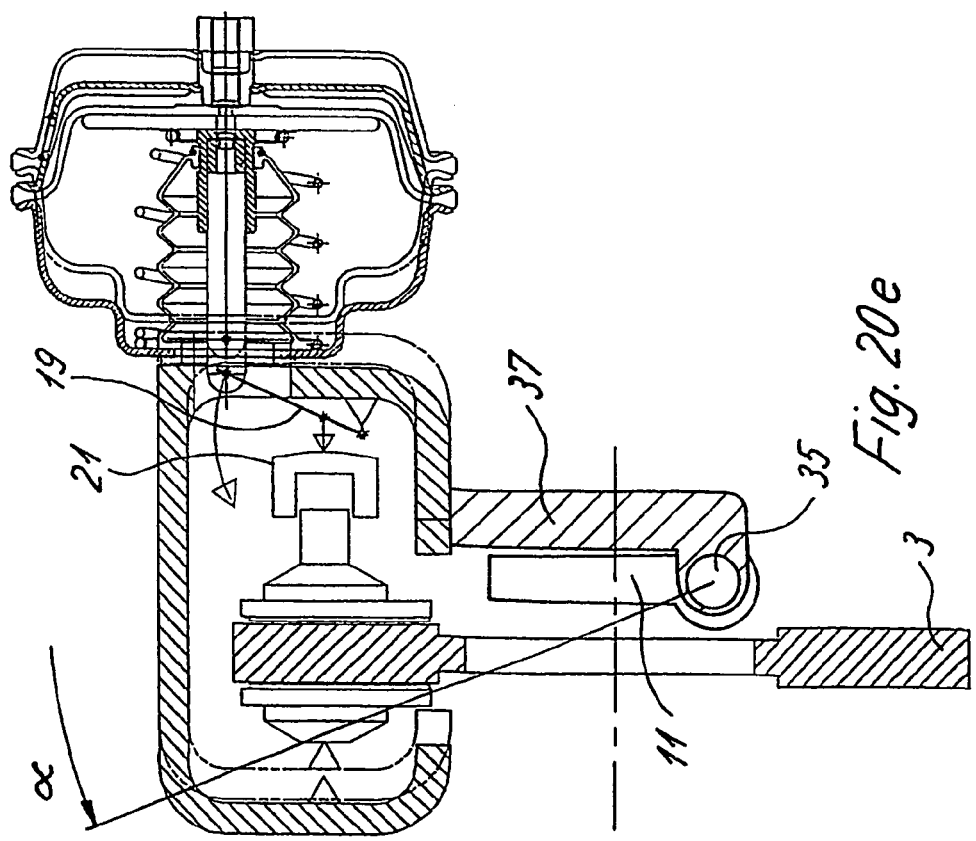
Figure 20H:
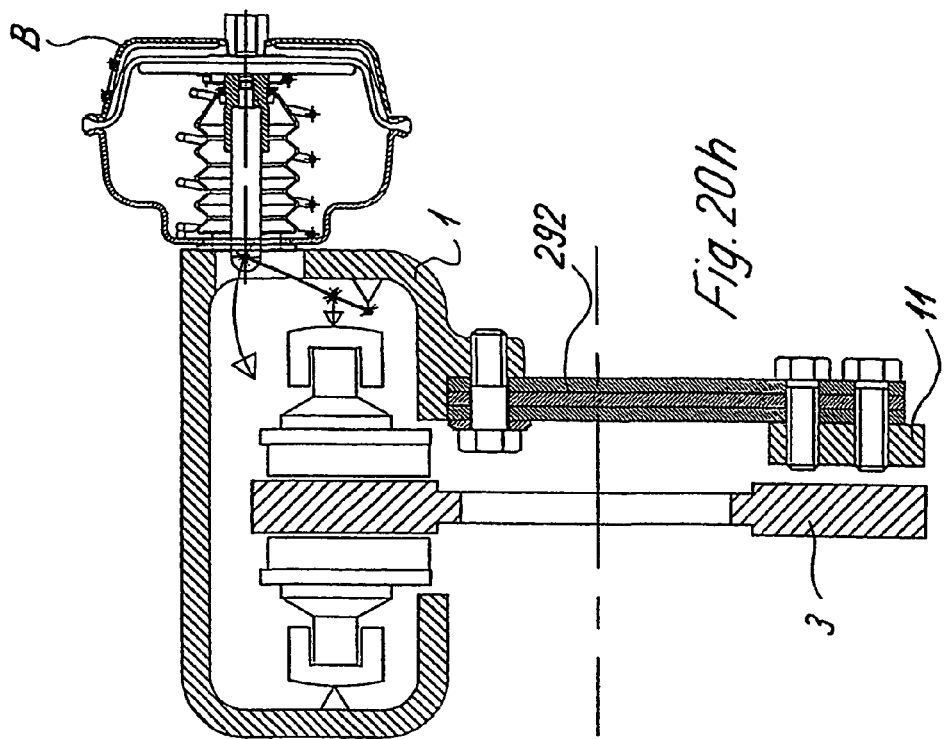
FIGS. 20*g, h* are schematic diagrams of additional variants of disk brakes.
Figure 20G:
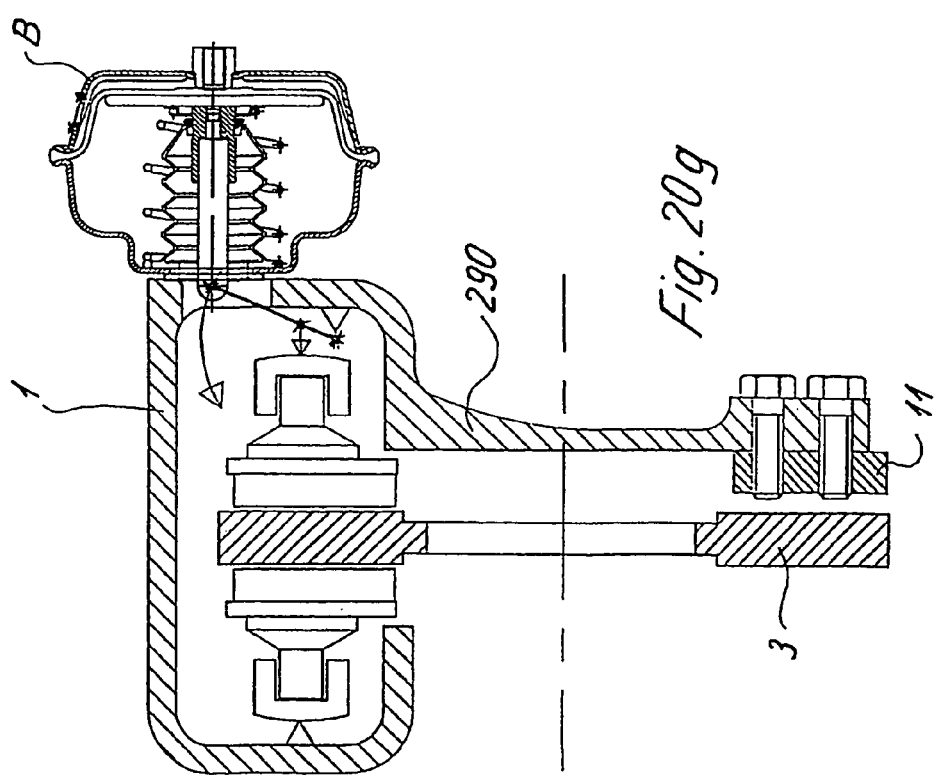

Another variant is illustrated in FIGS. 20*g* and *h*. Accordingly, the caliper 1 can be elastically deformed by the amount of half of the entire power stroke. According to FIG. 20*g*, the caliper has an elastic lower area 290 for fastening to the axle flange 11, and according to FIG. 20*h*, it is connected with the axle flange 11 by way of a separate elastic element 292 (for example, a leaf spring element) which is screwed between the axle flange and the caliper 1. A caliper bearing is no longer necessary. These variants can optionally also be combined with an elastically deformable brake disk (not shown here) or with a slidable brake disk, in which case the path of the caliper and of the brake disk to be bridged by elasticity may have a particularly small dimension.

Figure 4:
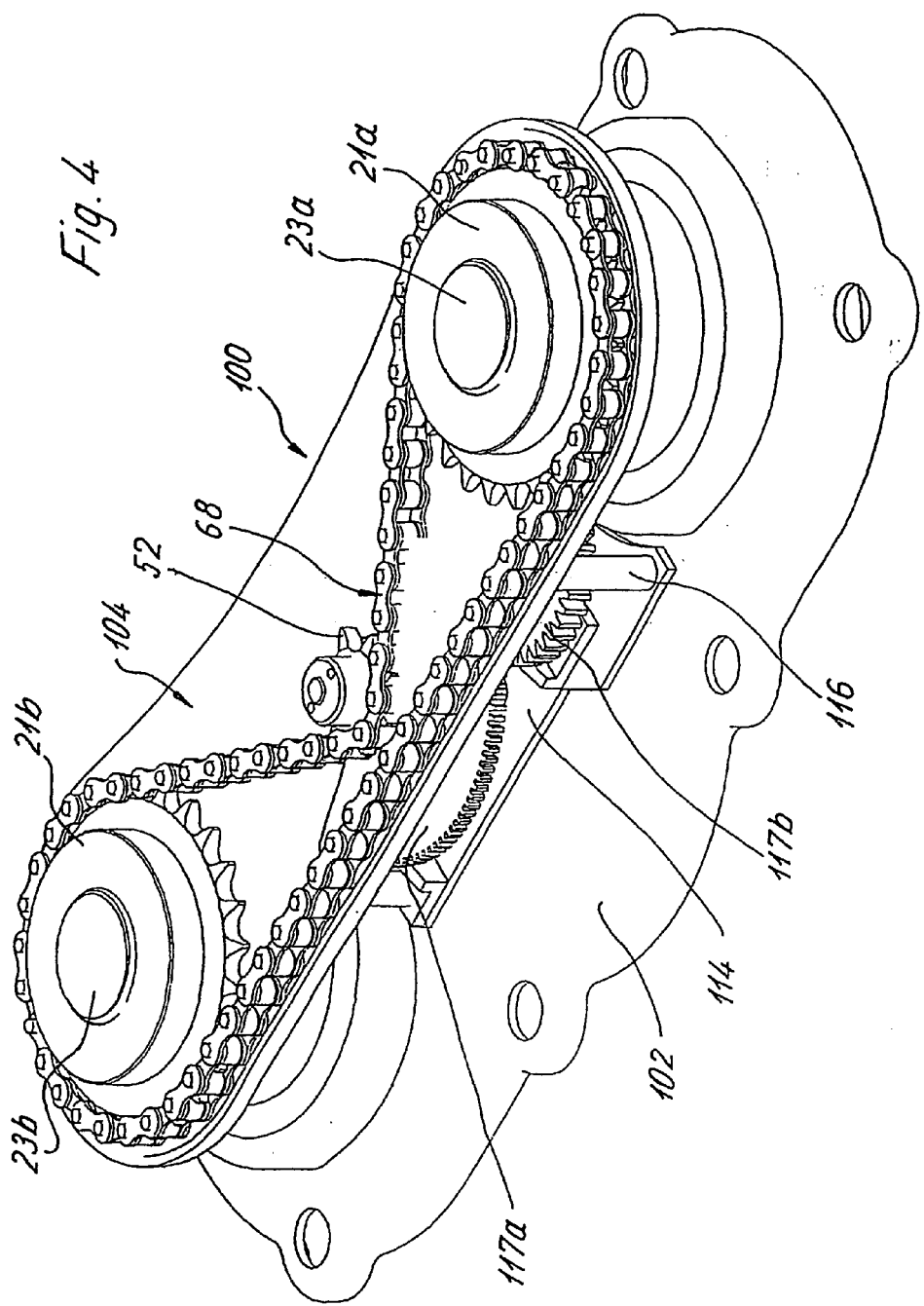
FIG. 4 is a perspective view of an adjuster module.

Advantageous further developments of the adjusting devices or of the entire adjusting mechanism with the adjusting devices and the adjuster drives are illustrated in FIGS. 2, 3 and 4.

According to FIG. 2, an adjuster module 50 is in each case arranged on one side of the brake disk 3 and has an output shaft with an output gearwheel 52 and a free-wheel device and/or an overload coupling device 53.

A synchronization chain 54 for the synchronization as well as the adjusting movements of all adjusting devices meshes with the output gearwheel 52. In the present case, two adjusting rotary devices are respectively arranged on each side of the brake disk 3. The disk brake of FIG. 2 therefore has a total of four adjusting rotary devices (adjusting sleeves 21*a*, *b*, 27*a*, *b*; thrust pieces 23*a*, *b*; 29*a*, *b*).

The synchronization chain 54 is situated in a plane perpendicular to the brake disk 3 in the upper interior area of the caliper 3 and is deflected at the caliper 1 on four bolts 56 four times by approximately 90°. In this manner, the chain 54 is guided essentially on a rectangular contour in the caliper 1, the synchronization chain extending around the brake disk 3 in its upper peripheral area.

The output gearwheel 52 drives the chain 54 on the side of the application device or on the side of the introduction of the braking power into the disk brake by way of (partial) ball-socket-shaped bearings (described in greater detail below) and two bearing balls 56*a*, *b* on the back of the caliper of the rotary lever 19 disposed at the caliper 1 (which in this area has a closed construction), which rotary lever 19 will be explained in greater detail below by means of the additional figures.

The synchronization chain 54 also meshes with four gearwheels 58*a*, *b*, 60*a*, *b*, which are each disposed on shafts 59*a*, *b*, which have cylindrical worms 62*a*, *b* (see FIG. 2*b*) in the downward direction, which cylindrical worms 62*a*, *b* mesh with an external toothing of the adjusting sleeves 21*a*,

*b* which are provided with an internal thread and are screwed onto the thrust pieces 23*a, b* provided with an external thread.

As a result of the synchronization device in the form of a synchronization chain 54 guided "around" the brake disk 3, it is therefore possible to drive, as well as synchronize, all four adjusting rotary devices on the two sides of the brake disk by means of only one "adjuster drive".

Another embodiment of the invention is illustrated in FIG. 3. In this embodiment, the rotations of the two adjusting sleeves 21*a, b* and 27*a, b* respectively on each side of the brake disk 3 are in each case synchronized by synchronization chains 68, 70 wound around gearwheels 64*a, b* and 66*a, b*, respectively, fitted onto the adjusting sleeves.

A synchronization of the rotary drives on one side of the brake disk is known from German Patent Document DE 42 12 405 A1. In the present case, the synchronization chains 68, 70 mesh on each side of the brake disk but, in addition, also in each case with an output gearwheel 52, which is arranged in the center between the two rotating spindles and to which one automatic free-wheel and/or overload coupling device 53 respectively is assigned.

According to FIG. 3, the synchronization of the adjusting rotary drive on each side of the brake disk 3 therefore takes place by separate synchronization chains 68, 70 arranged on the respective brake disk side (or correspondingly designed—here not shown—synchronization belts). A Bowden cable 72 in the nature of a bendable shaft with a spur gear or cross gear, which Bowden cable 72 is guided in a curve along the lines of a "cable channel" 74 in the caliper 1 around a side of the peripheral edge of the brake disk 3, transmits the driving power from the free-wheel and/or overload coupling device 53 on the side of the power introduction into the disk brake (here, on the left) to the reaction side. The two ends of the cable channel 74 are closed by means of sealing stoppers 76 pulled by way of the Bowden cable.

The embodiment of FIG. 3 has the advantage that a single chain, in the manner of the synchronization chain 54, is not excessively loaded but that, at relatively low constructive expenditures, the loads can be distributed to the two chains 68, 70 on each side of the brake disk 3 and the Bowden cable 72.

The actual adjusting drive according to FIG. 2 as well as according to FIG. 3 is implemented by a driving device 82, which is arranged at the rotary lever 19 and which acts upon a shift fork 84 disposed on the end of the shaft 86, on which the gearwheel 52 is also situated so that, when the disk brake is applied and during the movement of the rotary lever 19 connected therewith, a rotation of the gearwheel 52 is caused, the synchronization chains 68, 70 and the Bowden cable 72 transmitting this rotation to all four adjusting rotary drives.

It can also be easily recognized in FIG. 3 that the caliper 1 has a divided construction approximately in the plane of the brake disk. The two caliper parts 1*a* and 1*b* are screwed to one another by means of studs 78, which are guided from one side through the caliper part 1*a* and engage in bores 80 of the other caliper part 1*b*, which bores 80 are distributed along the outer circumferences and have an internal thread. The brake application device can be assembled in the caliper 1 or can be mounted as a preassembled application module (for example, in the manner of German Patent Document DE 195 15 063 C1). It is also easily visible in FIG. 3 that the fixed caliper 1 has a relatively light construction; that is, it can be limited to a constructive minimum. The caliper is preferably constructed in one piece and preferably without screws, the insertion of the elements of the application system and of the adjusting devices preferably taking place from the side of the brake disk.

The total transmission ratio of the synchronization mechanisms in FIGS. 2 and 3 is preferably selected such that the advancing movement on the application side and the reaction side takes place in a uniform manner. However, for compensating a systematically occurring wear difference, a stepping-up or stepping-down in the transmission of the adjusting movement between the application side and reaction side may be implemented.

Figure 5:
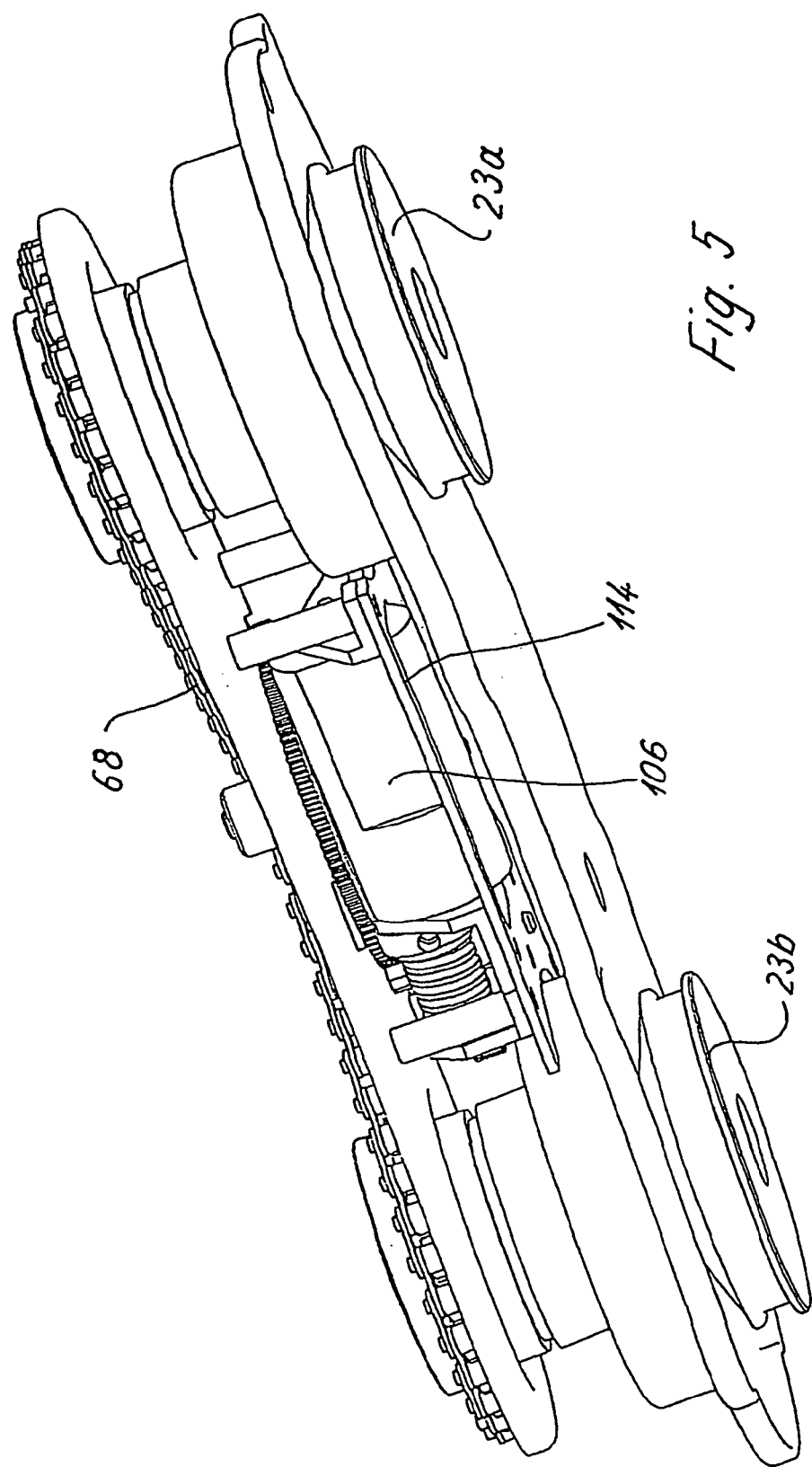
FIG. 5 is another perspective view of the adjuster module of FIG. 4.
Figure 6:
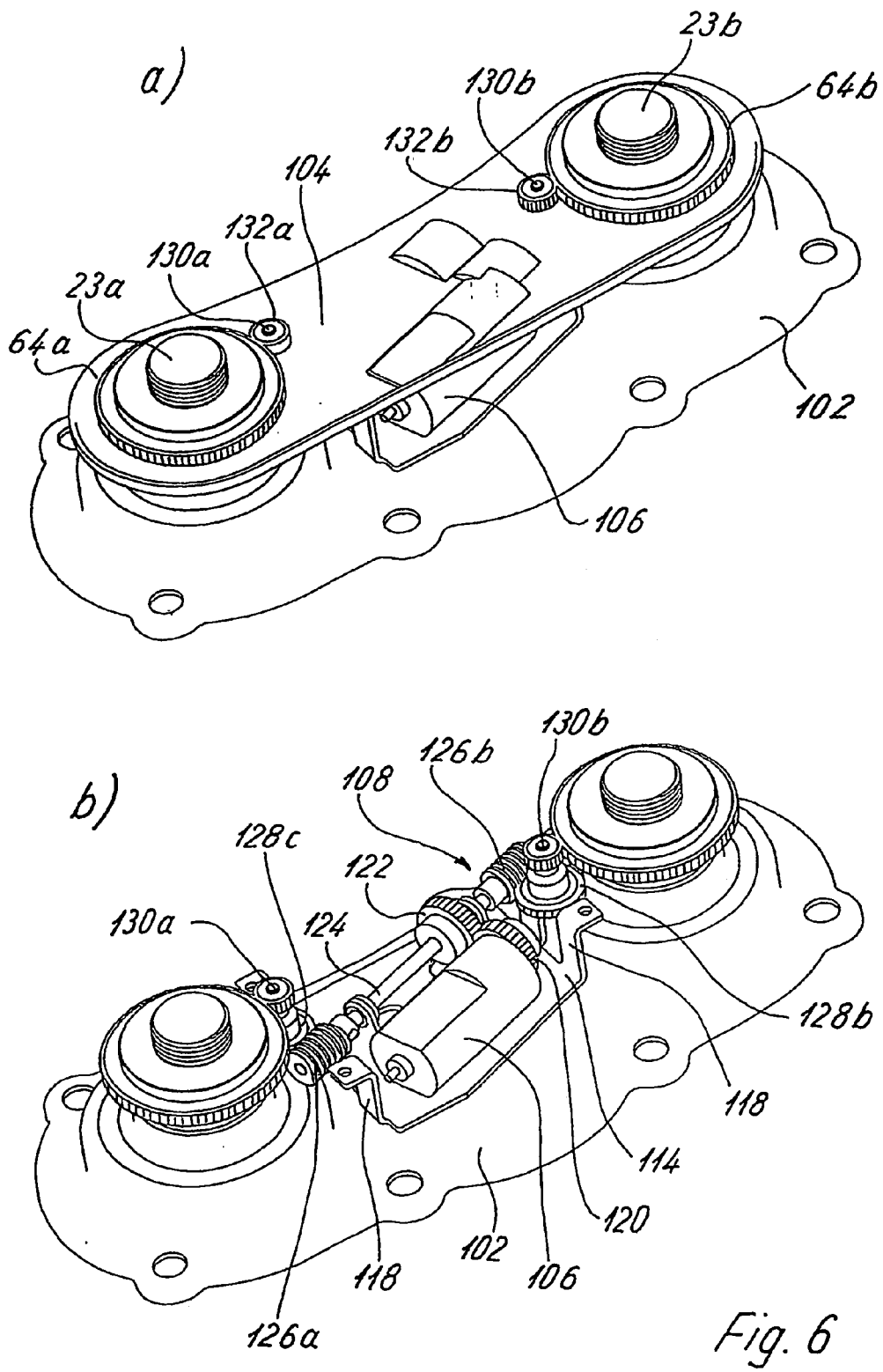
FIGS. 6*a, b* are perspective views of another adjuster module, in FIG. 6, one of the mounting plates having been removed.

Another characteristic feature of the disk brakes according to the invention with respect to their adjusting and synchronization mechanism is illustrated in the additional FIGS. 4, 5 and 6. These figures each show an "adjuster module" which can be produced in the manner of a preassembled unit and can be inserted into a corresponding clearance of the disk brake, particularly in the area of the application device.

In one of its top views, the adjuster module 100, which can be preassembled, has an elongated, essentially rectangular shape, however, with edges which are rounded and shaped-out according to requirements. It comprises two mutually spaced, mutually parallel and mutually essentially covering mounting plates 102, 104, between which a clearance is situated in which preferably an electric motor 106 as an adjuster drive and a transmission 108 is housed for converting the rotating movements of the drive shaft of the electric motor to an appropriate rotational speed for driving the adjusting rotary devices (spindles).

The mounting plate 102 has slightly larger dimensions than the other mounting plate 104 and is provided in the outer circumferential area with bores 110 for studs (not shown here) to allow fastening to the caliper. The mounting plate 102 is also used as a closing plate for caliper openings (see FIGS. 12 and 13). In contrast, the mounting plate 104 is mainly used for the mounting of the motor 106 and the transmission 108.

On the other mounting plate 104—for example, on its exterior side—the synchronization chain 68 can preferably be mounted which is laid around the gearwheels 64*a, b* and synchronizes the rotations of the adjusting sleeves 21*a, b* and thus those of the two adjusting rotary devices.

The adjusting sleeves 21*a*, 21*b*, in each case, reach through recesses/indentations/guides (not shown here) of the mounting plates 102, 104.

According to FIGS. 4 and 5, as well as according to FIG. 6, the electric motor 106 is disposed on a type of mounting metal sheet 114, which is fastened to one mounting plate 104 and on/at which spacers 116 and/or bends are provided by which the two mounting plates are fixed in a mutually parallel spaced manner. When an electric motor 106 is used, the use of mechanical free wheels and the use of overload couplings may optionally also be eliminated in the case of a corresponding electronic control system and/or a corresponding automatic electronic control system.

According to FIG. 4, gearwheels 117*a, b*, which are arranged between the mounting plates 102, 104, take over the transmission of the rotations of the electric motor 106 to the gearwheel 52.

The motor 106 fixed on the mounting metal sheet 114 is situated essentially at a slight angle to the straight line connecting the axes of the two adjusting sleeves. According to FIG. 6*b*, its output gearwheel 120 meshes with a gearwheel 122, which is disposed on a shaft 124 aligned parallel to the motor 106, which shaft 124 is disposed in recesses of two of the bends 116 of the mounting metal sheet 114.

Cylindrical worms 126*a, b* are in each case applied to the ends of the shaft 124, which cylindrical worms 126*a, b* mesh with the gearwheels 128*a*, 128*b*. Gear wheels 128*a*, 128*b*, by way of shafts 130*a*, 130*b* penetrating the other mounting plate 104 and at whose ends gearwheels 132*a*, 132*b* are arranged, mesh with the gear wheels 64*a*, 64*b* on the adjusting sleeves 21*a*, 21*b*. The cylindrical worms are constructed such (right-hand construction or left-hand construction) that no different thread directions (right-hand thread/left-hand thread) are required for the thrust pieces. The thrust pieces 23*a*, 23*b* can in each case be screwed with their thread inserts in a premountable manner into the adjusting sleeves 21.

Thus, one adjuster drive as well as the adjusting rotary devices, respectively, can be integrated in a space-saving manner in the adjuster module 100, which can be produced in a cost-effective fashion from only a few parts and is easily mountable, on each side of the brake disk as well as its synchronization mechanism.

One of the adjuster modules 100 can be provided on each side of the brake disk 3, in which case the synchronization of the adjusting movements can take place in a mechanically as well as electronically/computerized controlled and/or automatically controlled manner. It is only necessary to lead a power supply cable and/or a data transmission cable to the disk brake and to lead these in the disk brake to the adjuster module 100.

When using an electric adjuster drive with an electric motor 106, it is therefore basically possible to use only one electric motor 106 and to mechanically carry out the transmission of the adjusting movement from the application side to the reaction side, for example, in the manner of FIG. 2 or 3.

However, advantageously, an independent electric adjusting drive is arranged on the reaction side.

Because of coupling and sealing problems, the electric wiring connection of the reaction side with the application side can be implemented more easily than the mechanical transmission synchronization and, because of the possibility of the independent control of the two adjusting systems, additional control/automatic control possibilities of the operating behavior of the brake are obtained.

Thus, individual control of the adjusting rotary drives of the two adjuster modules 100 on both sides of the brake disk 3 permits the following:

An individual adjusting of the release play on both sides of the brake disk 3 to its respective occurring position; for example, when a mounted brake disk is used, its installation position may deviate +/−1 mm as a result of component tolerances;

an active restoring of the slidable brake disk or of the sliding or hinged caliper into a desired starting position is permitted after each braking;

in the event of the occurrence of an uneven brake pad wear, the release play can be adjusted to be unequal on the two sides of the brake disk in order to compensate for the uneven wear during subsequent brakings;

when the vehicle is used in off-road driving, the brake shoes/brake pads may be designed to grind slightly in order to keep the friction surfaces free of abrasive dirt; and a minimizing of the required release play and, thus, of the operating energy requirement is permitted.

Specifically, the above-mentioned advantages demonstrate that it is useful to combine the advantageous effects of the ideas of the brakes of FIG. 1 and/or of the synchronization mechanisms according to FIGS. 2 and 3 and/or of the adjuster modules according to FIGS. 4 to 6 to form a fundamentally new type of disk brake.

This will be explained in detail in the following by means of additional embodiments.

Figure 7:
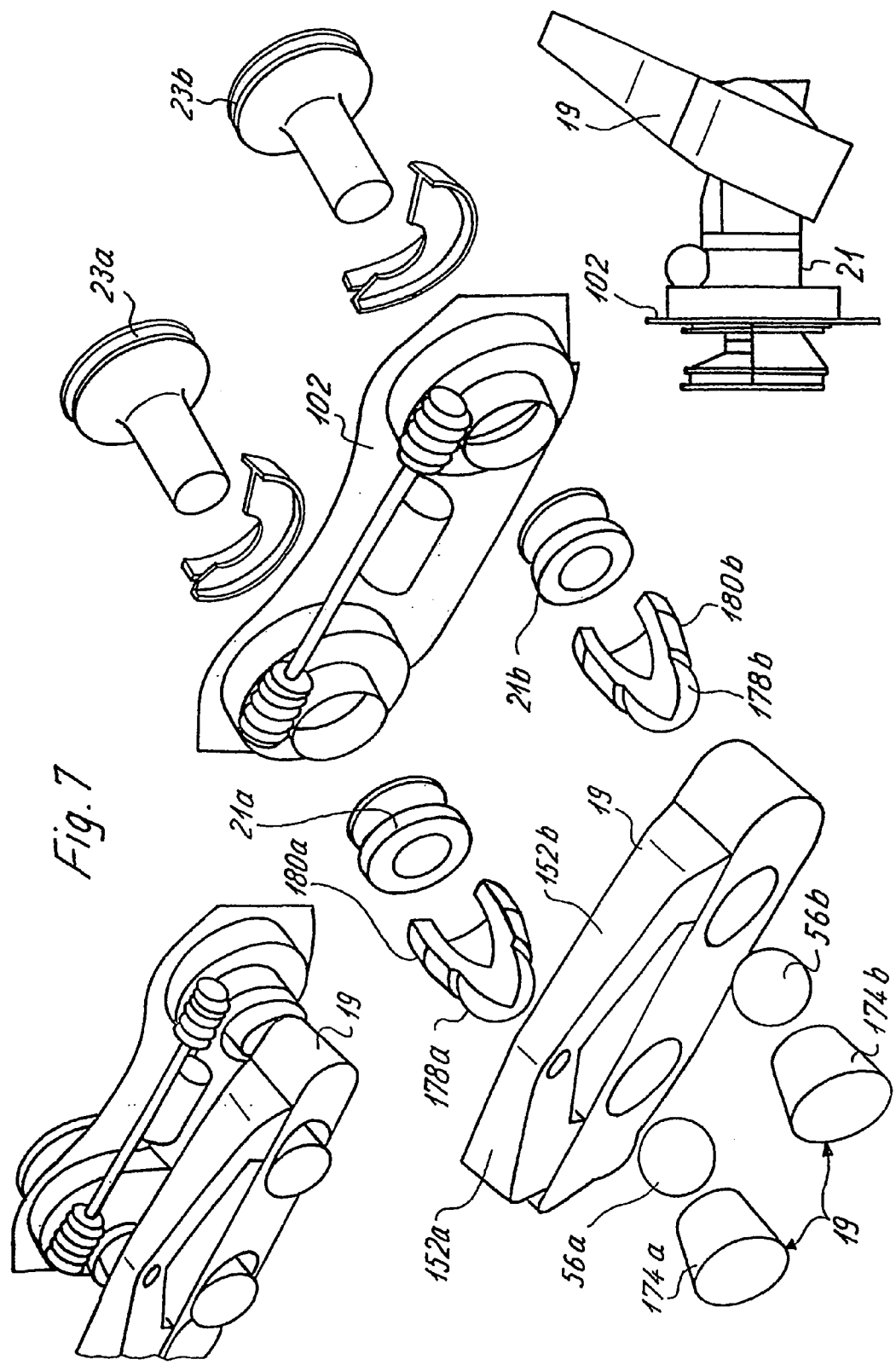
FIG. 7 is an exploded view of an application device and a side view.

FIG. 7 illustrates the novel construction and bearing of the rotary lever 19.

The rotary lever 19 is constructed as a traverse-type structural member, which makes the use of a separate traverse or cross-member with the rotary lever unnecessary.

Figure 9:
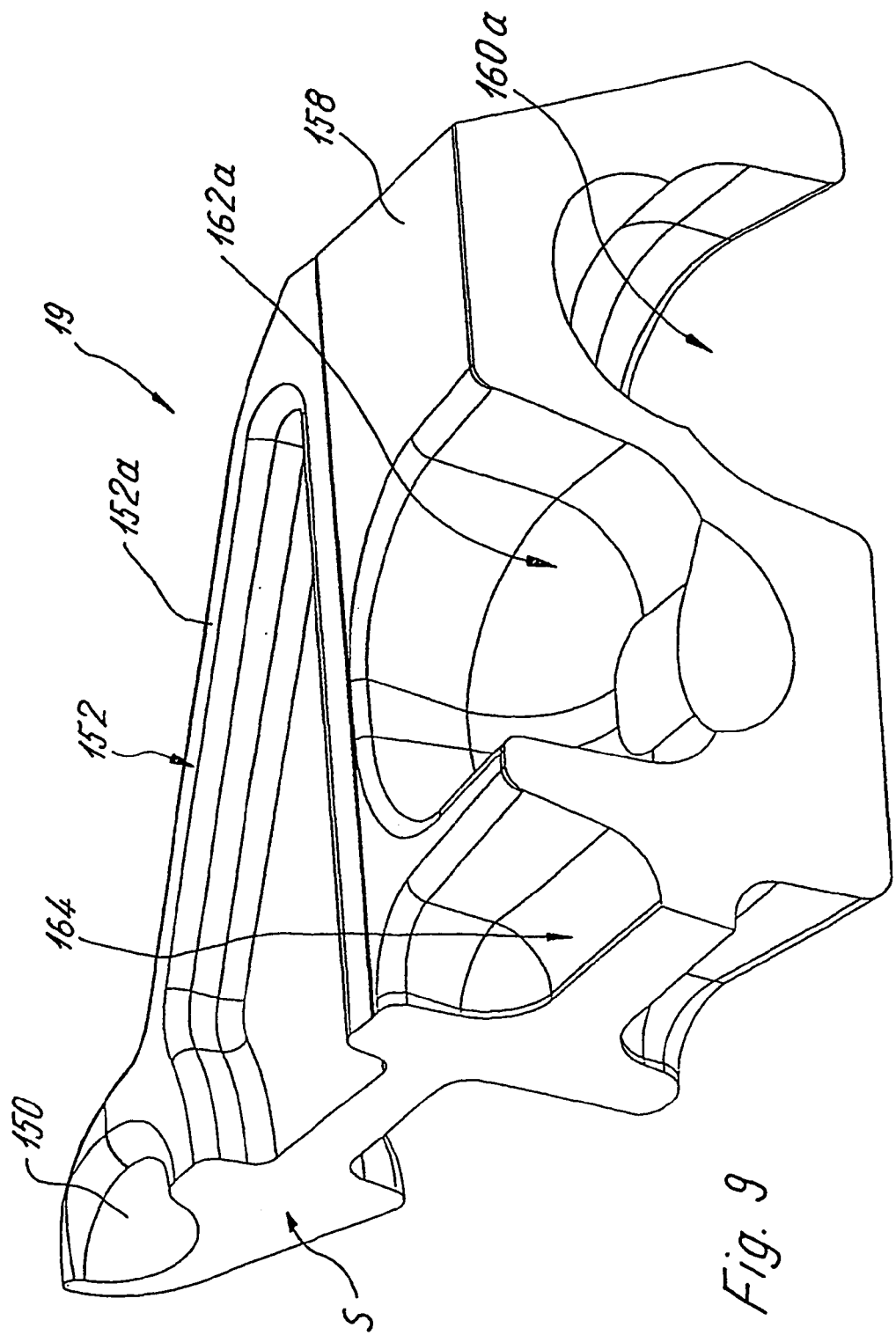
FIG. 9 is a perspective representation of a part of a rotary lever for application devices of the type of FIG. 7.

The construction of the rotary lever 19 is particularly shown in FIG. 9, which is limited to a sectional representation to the right of the plane of symmetry "S" of the one-piece rotary lever 19 and above another "plane of symmetry", but here only relative to the lower portion of the rotary lever.

The rotary lever 19 has an "upper" recess 150 (hemispherically cup-shaped) for receiving the end of a piston rod of an actuating device (for example, a brake cylinder, electrically and/or mechanically and/or pneumatically operable) (see, for example, also European Patent Document EP 0 531 321). From the area of the upper recess 150, the lever widens in the area of a "triangular" section 152 in the downward direction until it reaches a width exceeding the spacing of the two adjusting sleeves 21*a, b* and the thrust pieces 23*a*, 23*b*. It also widens in the direction (viewed in the installed position) perpendicular to the brake disk.

As shown in FIG. 10, in the area of the triangular section 152, recesses 154, 156 are provided on the two main outer surfaces of the rotary lever 19, which recesses 154, 156 minimize the weight of the rotary lever 19. The strut-type edges 152*a* of the triangular section 152 of the rotary lever provide the lever, in this area, with an increased stability with respect to bending loads.

The triangular section 152 of the rotary lever, which in the conventional representation of FIGS. 7 and 9, is "situated at the top", is adjoined in its lower area, which faces away from the recess 150, by a traverse-type section 158 of an essentially constant width, which is essentially rectangular in the top view but which in comparison with the triangular section has an essentially step-type clearly enlarging depth (in the installed position, viewed perpendicular to the brake disk plane).

In the rectangular section of the rotary lever, essentially six additional recesses 160*a*, 162*a, b* and 164, 165 are constructed, in which case the two outer recesses 160*a, b* are constructed on the side of the rotary lever 19 situated opposite the recess 150 for receiving the piston rod; the additional recesses 162*a, b* adjoining the above recesses toward the inside are constructed on the side of the recess 150; and the central recesses 164, 165 are constructed on both sides of the rotary lever 19.

The four recesses 160*a, b* and 162*a, b* each have a rectangular construction with tapered, rounded ends. The recesses have an essentially cup-shaped/hemispherical-shell-type design (eccentric domes and lever domes) in their end area, while the center recesses 164, 165 have a narrower oblong shape.

Figure 8:
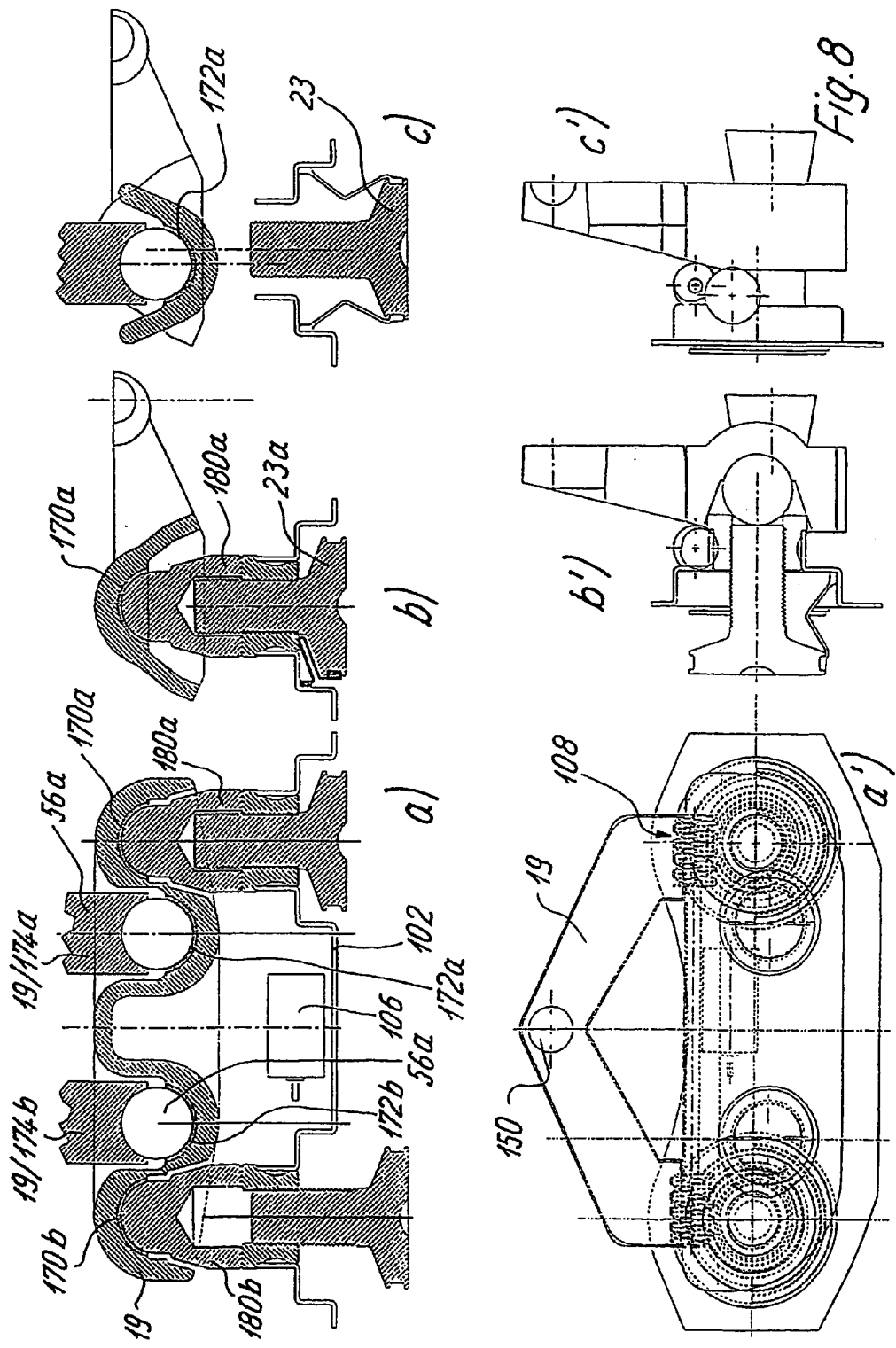
FIGS. 8*a–c; a'–c'* are additional views and sectional views of the application device of FIG. 7.

The four recesses 160 and 162 are used for receiving-corresponding essentially hemispherical-/partially-spherical-shell-type, cup-shaped slide bearing shells 170*a, b*, 172*a, b* (see FIG. 8).

Such hemispherical-/partially-spherical-shell-type, cup-shaped slide bearing shells can also be inserted into the recess 150. The bearing balls 56*a*, 56*b* are inserted into the slide bearing shells 172*a, b* situated on the inside.

These bearing balls can be supported directly on the back of the caliper, on projections of the back of the caliper, or on separate components 174a, b which are fixedly connected with the back of the caliper.

For this purpose, the caliper or the additional components are to be provided with corresponding cup-shaped recesses 176a, b, in which the bearing balls 56 engage. The bearing balls 56 can be fixed in the recesses 176.

Bearing balls or spherically shaped ends 178a, b of intermediate pieces 180a, 180b engage in the outer recesses 160a, b or in the slide bearing shells 170a, b, 172a, b inserted into the latter. The intermediate pieces 180 have a sleeve-type construction on their ends opposite the spherically shaped ends and receive the ends of the thrust pieces 23a, b facing away from the brake disk, if the pads are not yet worn out (see FIG. 8a).

The intermediate pieces 180 are axially, at their ends facing away from the rotary lever, adjoined by the adjusting sleeves 21a, b with the internal thread, which can be inserted into the mounting plate 102 and/or 104. The stud-type ends of the thrust pieces 23, which widen just in front of the brake disk 3, are screwed into the adjusting sleeves 21. By means of the rotation of the adjusting sleeves 21, the axial distance between the thrust pieces and the rotary lever 19 can therefore be changed for adjusting the brake pad wear, in which case the possibility of rotation via a worm gear transmission 108 is outlined purely schematically, which acts upon the external toothing or a gearwheel on the adjusting sleeves 21.

The intermediate pieces 180 are therefore used for the transmission of power from the rotary lever 19 to the thrust pieces 23 during the application of the brake.

According to FIGS. 7 and 8, one pair of bearings, consisting of one lever bearing and eccentric bearing respectively, is arranged on the cross-member type brake or rotary lever 19 on each side of a longitudinal center line. (Line A—A in FIG. 10).

These two bearings each consist of the ball 56, 178 (preferably a roller bearing ball sliding body) as well as of the cup-shaped slide bearing shell 170, 172 engaging with the ball 56, 178, as well as of the cup-shaped indentations/recesses 176, 177, which support the ball, in each case in the component (caliper 1 or intermediate piece 180) which interacts with the ball and which does not receive the slide bearing shell.

The two pairs of bearings are received on both sides of the rotary lever 19 in the rectangular section 158 of the cross-member type rotary lever 19 arranged at a right angle with respect to the lever arm (A—A). The sliding balls 56a, 56b and 178a, 178b are therefore arranged at the rectangular section 158 of the lever on opposite sides of the latter with an opposed pressure direction.

In addition, the sliding balls 56a, 56b and 178a, 178b are spaced away from one another with their ball centers in the longitudinal direction of the traverse-type lever section (thus perpendicular to the lever arm A—A in FIG. 1, parallel to the brake disk 1) as well as transversely to this longitudinal direction.

The spacing "x" transversely to the longitudinal direction defines the eccentricity of the eccentric arrangement causing the power transmission.

In contrast, the spacing "y" in the longitudinal direction is required in order to avoid overlapping of the two bearings or in order to be able to accommodate these bearings jointly in the rotary lever 19.

The bearings, which are in each case situated opposite one another in the traverse-type section 158 of the rotary lever 19, are arranged in this section 158 such that the ball centers are almost, or completely, situated on a connection plane with the pivot of operation on the lever arm (recess 150, see Line "L" in FIG. 10).

However, it is also contemplated that the position of the eccentric bearing for achieving a defined change of the transmission ratio as a function of the lever position deviates by a given amount from the connection plane of the center of the lever operation to the lever bearing centers. The respective upper bearing, that is, the bearing situated on the side of the lever operation, causes the support of the rotary lever 19 against the caliper. The respective lower bearing transmits the operating force to the application-side thrust piece(s).

As in FIG. 8, the slide bearing shells may be arranged in the rotary lever 19 as well as (not shown) in the respective part of the caliper 1 or of the intermediate elements 174 which faces away, or on both sides of the balls 56, 178.

It is particularly advantageous to receive the balls 56, 178 in the component, which in each case faces away from the slide bearing shell, in a cup diameter which is by a defined amount larger than the ball diameter, so that, during the operation of the rotary lever 19, the ball, in addition to the sliding movement in the bearing shell, also carries out a limited rolling movement in the opposite receiving cup and, thus, reduces the necessary sliding movement in the bearing shell for carrying out the lever swivelling stroke and thus also the bearing friction.

The receiving play of the sliding ball in the receiving cup also permits the avoidance of the otherwise necessary tilting movement of the piston. In this case, a compensating movement in the swivel joint is superimposed on the exclusively rotatable driving of the piston.

For achieving a sufficient rolling play in the swivelling direction of the rotary lever 19 with a simultaneously good guidance transversely to the swivelling direction, the lever cup (recess 162) can be provided in a toroidal manner with a larger cup diameter in the swivelling direction than transversely to this swivelling direction.

As a result of the further development of the rotary lever 19 illustrated in FIGS. 7 to 10, in a particularly uncomplicated manner, the use of particularly simple and cost-effective ball slide bearings is permitted.

The deformation of the rotary lever 19 because of the axial distance of the power introduction into the bearings of a pair of bearings, and the resulting bending moment, can be minimized by the traverse-type further development.

As a result of the spherical shape of the bearing elements, a tilting course of the bearings is completely excluded; that is, also in the event of deformations of the rotary lever, the bearing capacity and the maximally achievable service life of the ball slide bearings will be fully utilized.

Furthermore, the rotary lever 19 is sufficiently fixed by the balls 56 relative to the caliper, so that a further, possibly frictional guiding of the rotary lever is no longer required.

For the special case of a brake having only one adjusting rotary device or only one spindle on each side of the brake disk, or on one side of the brake disk, the rotary lever may be constructed with two lever bearings at the ends of the traverse-type section 158 and with only one eccentric bearing in the center (not shown).

The rotary lever 19 of FIGS. 1 to 10 is suitable for caliper constructions of all types; thus, for virtually all caliper types, particularly also those of FIG. 1 (hinged caliper, sliding caliper, fixed caliper).

It is also contemplated that the essentially spherical bearing elements 158, 160 and the pertaining cups have an elliptical shape which is flattened with respect to the ball geometry.

Figure 12:
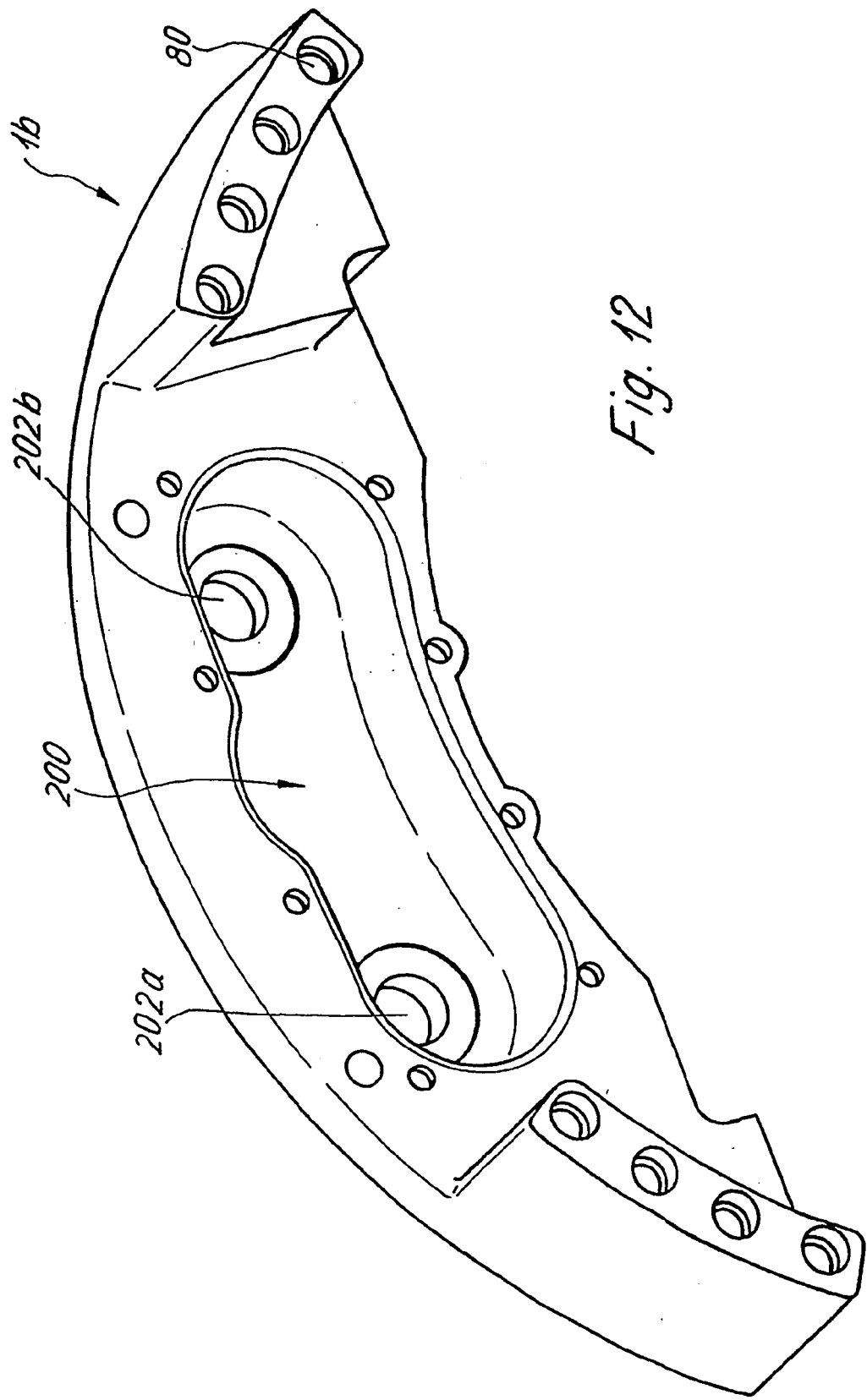
FIGS. 12, 13 are a perspective view of a reaction-side part of a two part caliper and a perspective view of the application side caliper part.
Figure 13:
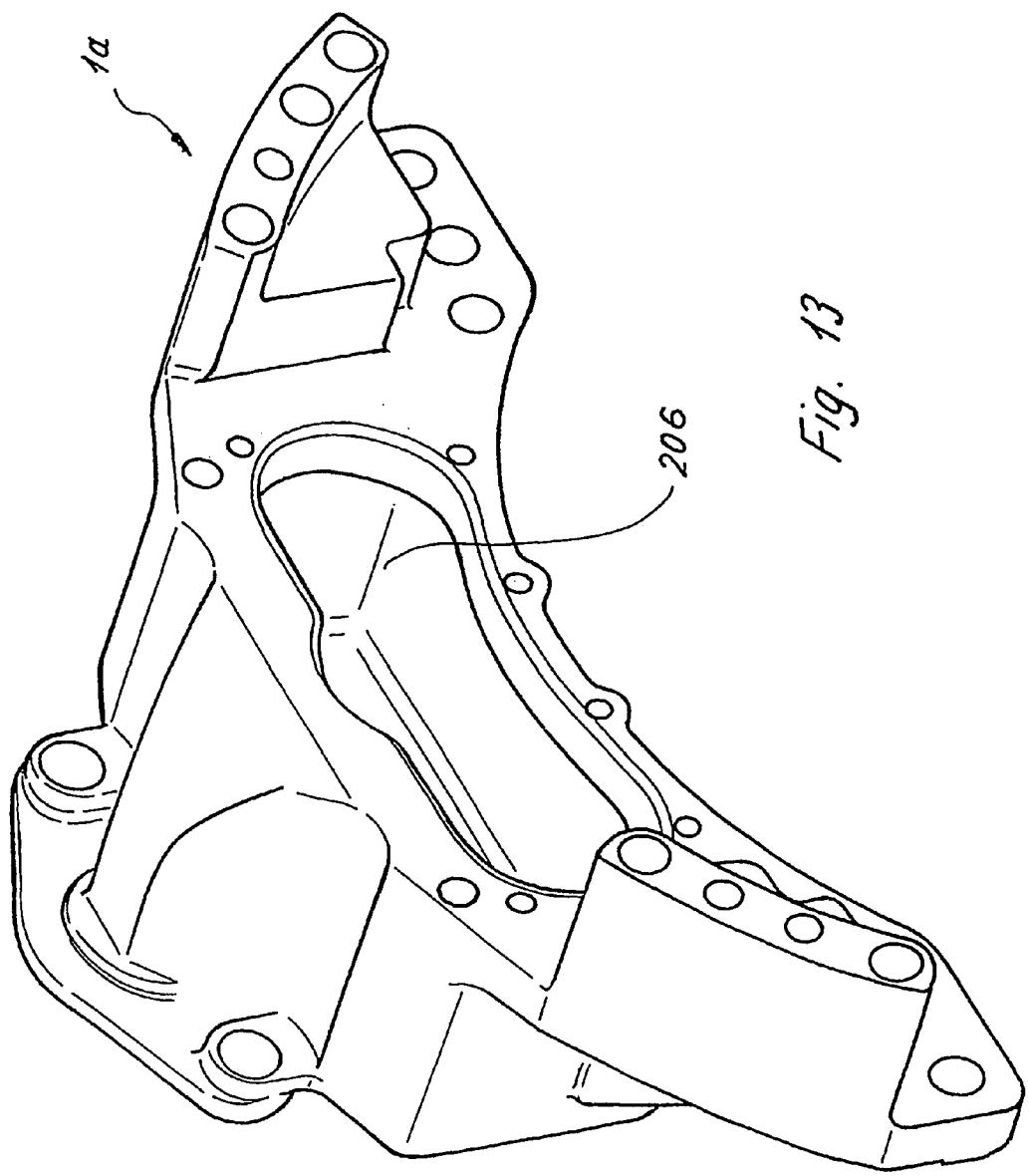

As examples, FIGS. 12 and 13 show possible caliper geometries of caliper parts 1a and 1b.

The reaction-side caliper part 1b of FIG. 12 has a recess 200 for receiving the adjuster module 100, which recess is provided with two indentations 202a, 202b for receiving the ends of the thrust pieces 29a, 29b. Bores 204 are distributed around the recess 200, to which bores 204 the mounting plate 104 can be screwed.

In contrast, the application-side caliper part 1a of FIG. 13 has a recess 206 open from the caliper wall toward the brake disk 1 (facing the brake disk), into which recess 206 the adjuster module 100 can be inserted. Bores 204 again are distributed around the recess 206, to which bores the mounting plate 104 can be screwed (optionally with an additional surrounding sealing ring).

Figure 14:
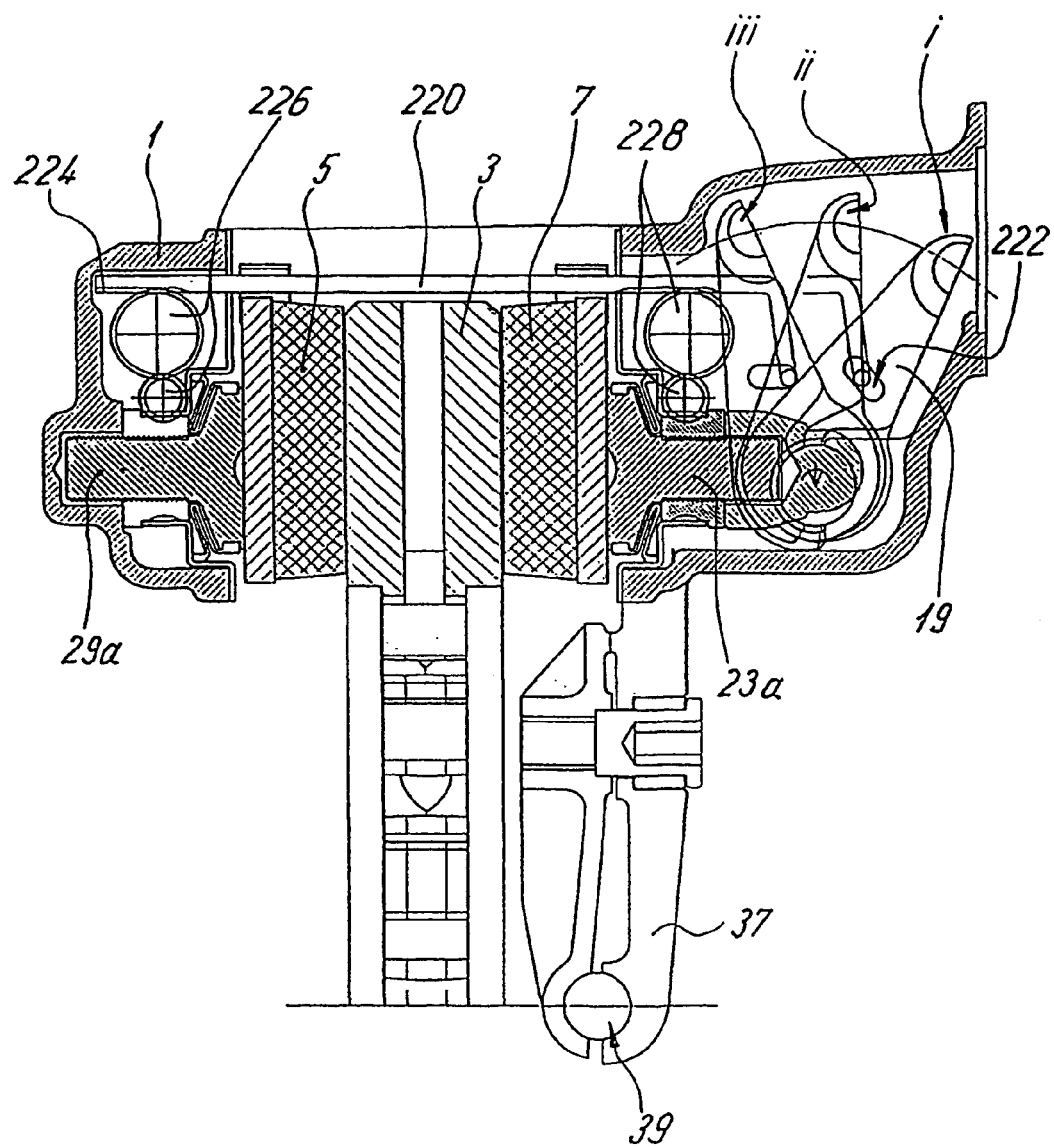
FIGS. 14, 15 are sectional views of hinged caliper disk brakes.

FIG. 14 is a sectional view of a disk brake whose basic principle corresponds to FIG. 1f and which, in addition, utilizes important ideas of the other embodiments.

Figure 11:
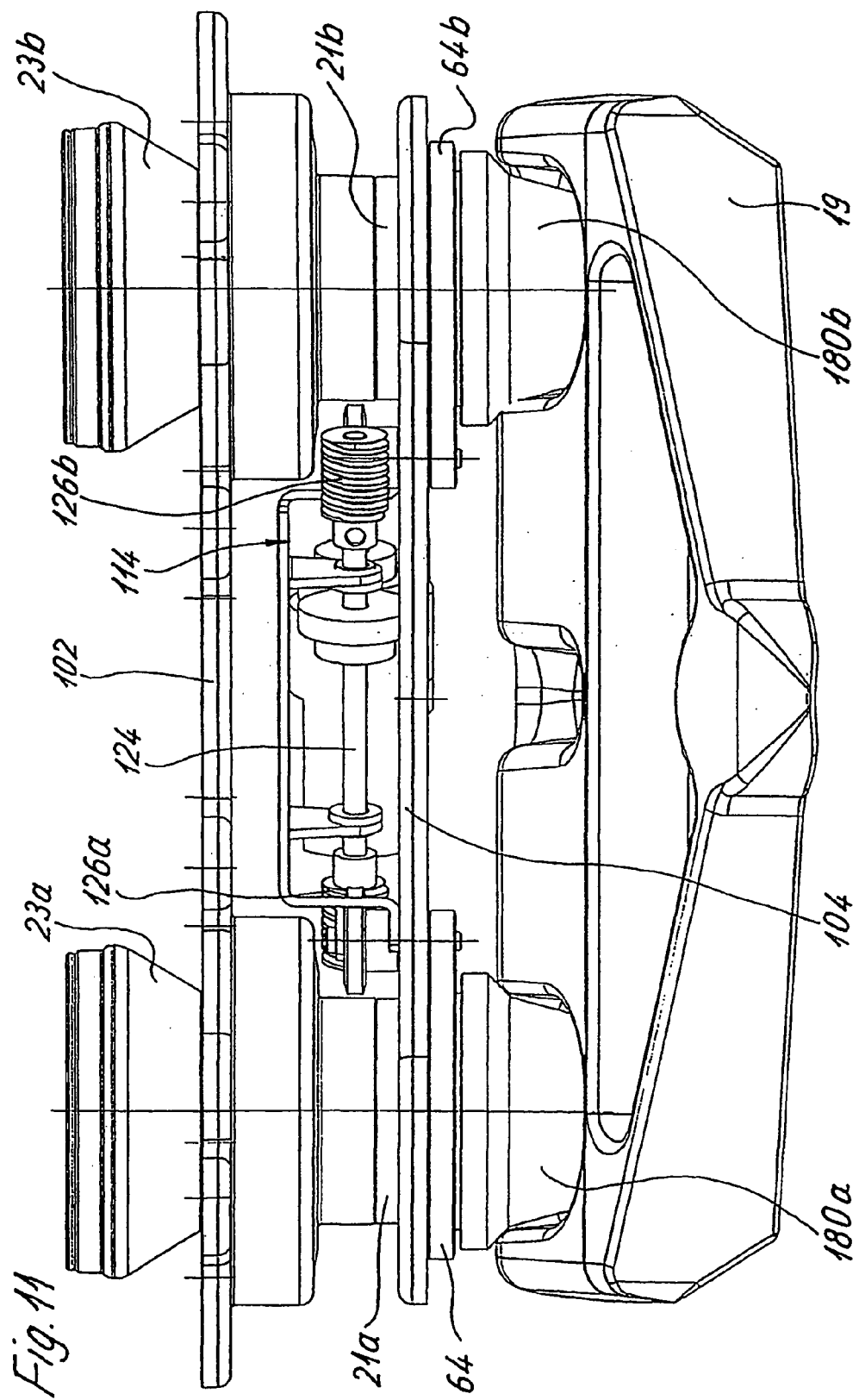
FIG. 11 is an application unit which can be preassembled and consists of the adjuster module and the rotary lever.

In contrast, FIG. 1f shows a disk brake with a swivellable caliper 1, which has the pivot bearing 39 coupled to the axle flange 11. The "hinged caliper" which is disposed on the pivot bearing 39 by way of the two-part strut connection 37 can be swivelled about an angle α, which is large enough that the brake pads 5, 7 can be swivelled by the path of the working stroke relative to the brake disk 3. This disk brake also again has an application device only on one side of the brake disk 3 with the rotary lever 19 of the type of FIGS. 10 and 11 but, on both sides of the brake disk 3, has at least one adjuster rotary device with thrust pieces 23a, b and 29a, b as well as the adjusting sleeves 21a, b and 27a, b.

In FIG. 14, the axial offset of the rotary lever is easily visible in its lower traverse-type area at the level of the thrust pieces 23 relative to the brake disk 3 during its movement from position "i", by way of position "ii", into position "iii". The synchronization of the adjuster rotary device with the thrust pieces 23a, b and 29a, b as well as the adjusting sleeves 21a, b and 27a, b is achieved here in that a driving device 220 is linked to the rotary lever 19 in an oblong hole 222 of the latter. The driving device 220 has a rod-type construction and reaches over the upper circumferential edge of the brake disk 3. On its side facing the brake disk 3, it is also provided in sections with a type of toothed-rack profile 224, which meshes with gearwheels 226, 228. The gearwheels 226, 228, during an axial displacement of the driving device 220, rotate the adjusting sleeves 21, 27 and cause the adjustment. In this case, a free wheel and overload device is to be provided on each side of the brake as well as a synchronization of the two adjuster rotary devices on each side of the brake disk.

Figure 15:
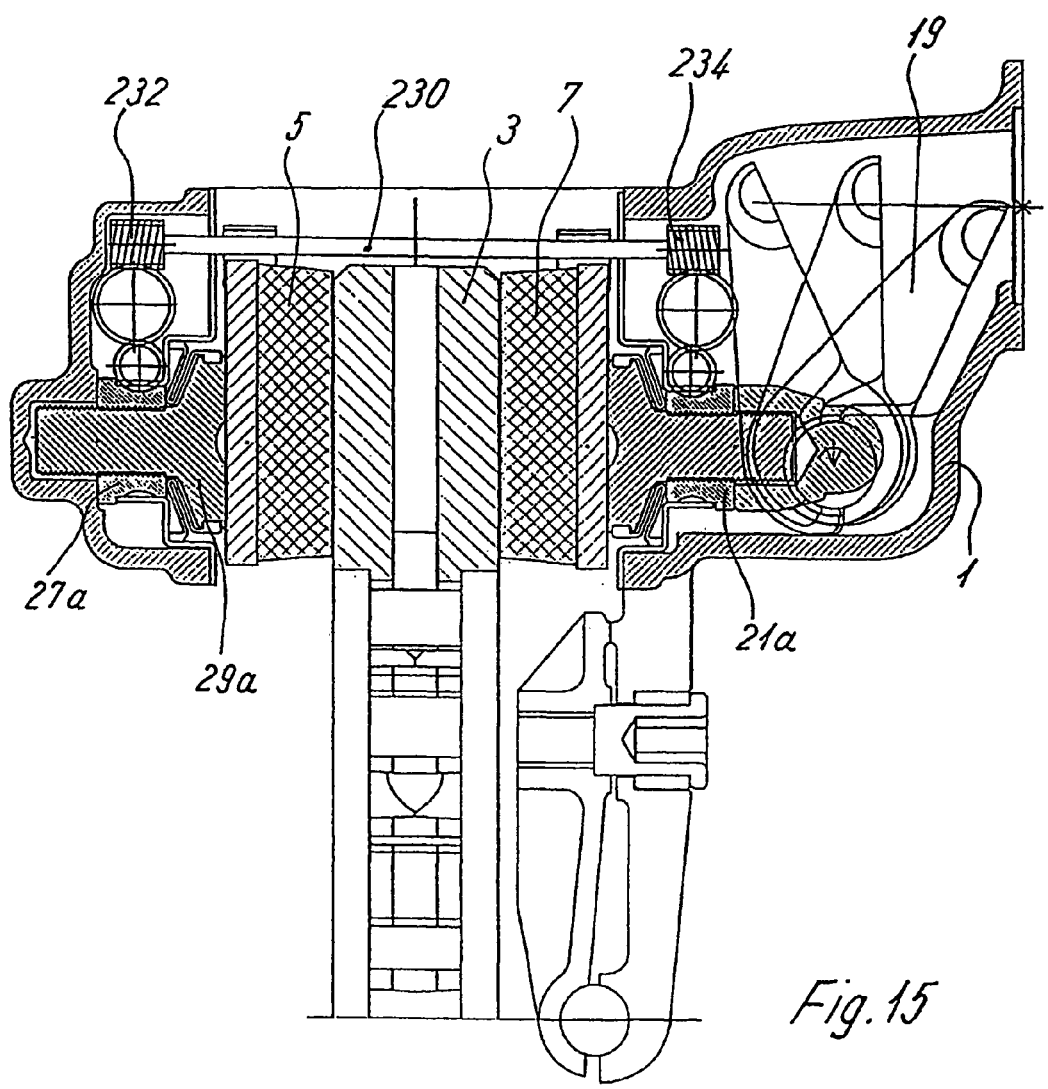

The application mechanism of FIG. 15 corresponds to that of FIG. 14. However, the adjusting synchronization takes place by way of a shaft 230, which shaft 230 reaches over the brake disk and has cylindrical worms 232, 234 at its ends.

FIG. 16 is a purely schematic view of the arrangement of the electric-motor adjusting drives 106 on each side of the brake disk.

According to FIGS. 17a and b, the essentially spherical bearing elements 56, 178 and their receiving devices 235, 236—here, at the components 174a, b, and at the intermediate pieces 180a, b—have mutually corresponding flattenings 237, 238 on their sides pointing toward one another.

In this manner, an uncomplicated protection against torsion is ensured in order to prevent damage to the ball surface and/or the bearings in the area of the bearings. In addition, the flattenings 237, 238 contribute to an optimization of the space requirement of the bearings and to an increase of the stability.

The play between the essentially spherical bearing elements 56, 178 and their receiving devices 235, 236 in a simple manner permits a compensation of tolerances.

Figure 19:
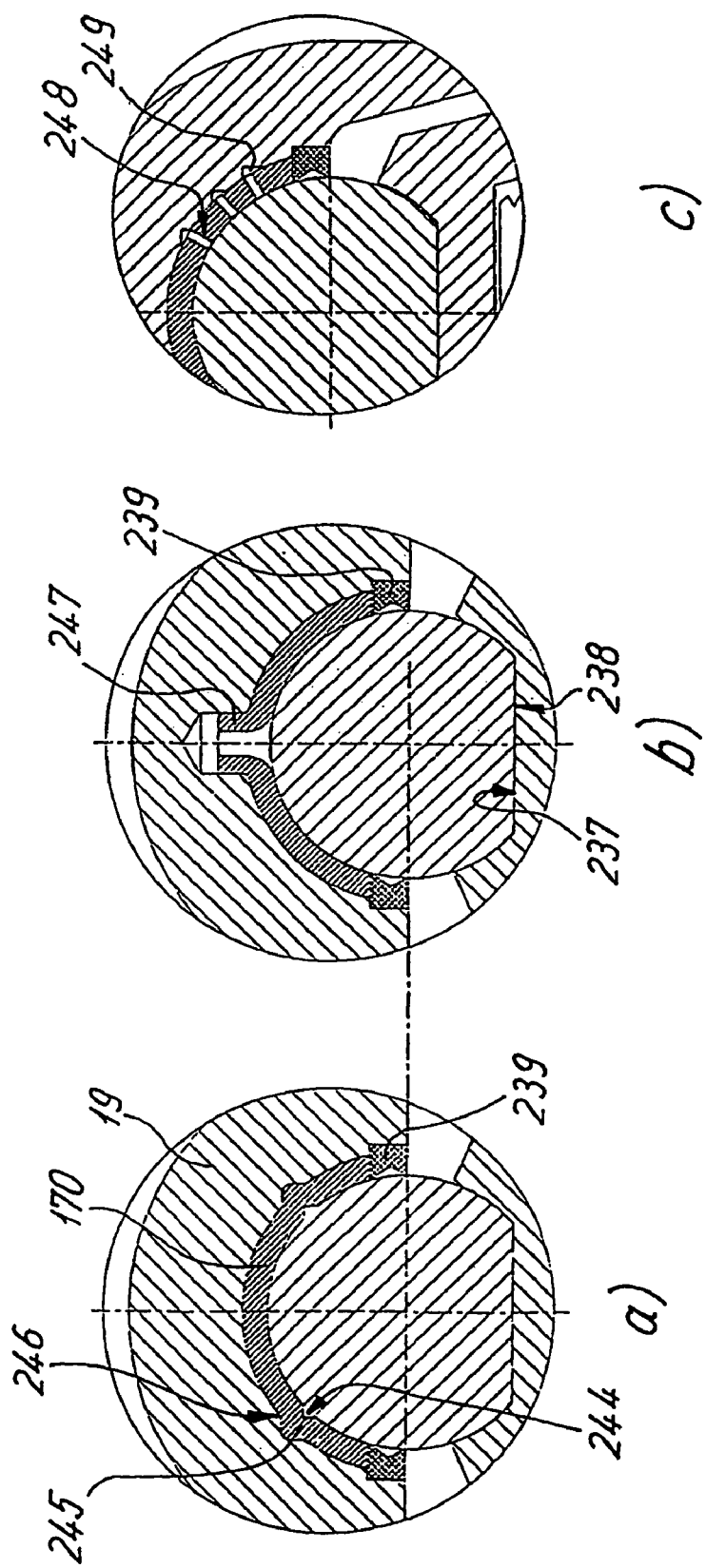

In a simple manner, as illustrated in FIG. 19, a stripper 239—for example, in a ring shape—is provided on the bearing cups 158, 160 and prevents the grease-filling from leaking-out.

FIGS. 18a–e show other variants of devices for protection against torsion occurring between the essentially spherical bearing elements 56, 178 and their receiving devices 235, 236.

Thus, according to FIG. 18a, the devices for protecting against torsion are constructed as a butt-welded or friction-welded seat 240.

According to FIG. 18b, the devices for the protection against torsion are constructed as a spring dowel pin or spring dowel sleeve 241.

According to FIGS. 18e, f and g, the essentially spherical bearing elements 56, 178 and their receiving devices 235, 236 have mutually corresponding torsion-proof geometrical shapes as a device for protecting against torsion on their mutually facing sides, specifically in the manner of mutually corresponding, mutually engaging indentations 242 and projections 243, which have a conical (concave/convex; see FIGS. 18c and d) or ball-socket-shaped or section-shaped (see FIG. 18e) construction.

The different geometrical shapes may be achieved, for example, by grinding commercially available bearing balls.

In addition to the strippers 239, FIG. 19a illustrates position-fixing, mutually corresponding projections 244 and recesses between the bearing balls and the bearing shells. The bearing shell recesses are constructed as shaped-out sections 245 which, on their side facing away from the bearing balls, in turn, engage in corresponding recesses 246 in the corresponding structural member—here, in the rotary lever—, so that a fixing of positions is also achieved between the bearing shells 170, 172 and the rotary lever.

According to FIG. 19b, a cylindrical extension 247 is constructed on the bearing shell. The cylindrical extension 247 engages in the corresponding structural member—here, the rotary lever 19—and is used for fixing the position and as a grease reservoir.

According to FIG. 19c, bores 248 for the passage of grease are provided in the bearing shell to improve lubrication. The bores 248 lead into the grease receiving grooves 249 in the corresponding component—here, the rotary lever 19.

FIG. 20a–h show disk brakes analogous to FIG. 1 in a detailed representation.

Thus, the disk brake of FIG. 20a again has a fixed caliper (a caliper 1 which can be fixedly or stationarily fixed on the axle) so that application devices 13, 15 are provided on both sides of the brake disk for the application (and release) of the brake pads 5, 7 in the direction of the brake disk 3. These application devices 13, 15, in turn, in each case, have at least one of the adjusting rotary devices with one adjusting sleeve 21, 27 respectively, in which one of the thrust pieces 23, 29 is in each case screwably arranged. The two rotary levers 19, 25 are mutually coupled by way of the coupling mechanism in the form of the bolt 31.

A pneumatically actuated brake cylinder 274 and piston rod 276, which piston rod acts upon the rotary lever and which is linked to the upper end of the rotary lever 19, are recognizable in FIG. 20a. The pneumatic actuating device preferably has a compact construction; an electromechanical actuation device could also be used.

In contrast, according to FIGS. 20b, d and f, the caliper has an application device 13, in each case, only on one side of the brake disk 1. The generation of the reaction power takes place on the side of the brake facing away from the actuating device by a sliding or swivelling of the caliper 1 and/or the sliding of the brake disk 3. The wear adjustment on the reaction side is in each case implemented by an adjusting device, such as an adjusting module, integrated in the caliper on the reaction side.

The sliding or swivelling travel to be carried out by the caliper 1 and/or the brake disk 3 is limited to the power stroke required for the application of the reaction fore, which power stroke amounts to only a fraction of the wearing stroke.

According to FIG. 20b, adjusting devices are arranged on both sides of the disk brake, which adjusting devices again have the mutually screwed-together and, therefore, also mutually axially adjustable adjusting sleeves 21, 27 and thrust pieces 23, 29, as well as preferably also separate adjuster drives on both sides of the brake disk 3. The brake disk 3 is constructed as a sliding disk, for the purpose of which the brake disk is preferably provided with a toothing in the area of its hub, which has a sliding travel limited to the power stroke.

Like FIG. 1c, FIG. 20c shows the state of the art for a sliding caliper disk brake, where the caliper is constructed as a sliding caliper with a caliper bearing slidable along the path of the power stroke relative to the brake disk or to the wheel axle 9 or the brake anchor plate (not shown here) normally provided in the case of sliding caliper disk brakes. In this case, the bearing bush 254 is designed for bridging a sliding path S which essentially corresponds to the amount of the maximal brake pad wear (here also marked "S").

According to FIG. 20d, the caliper 1 is "micro-displaceable" by an amount which is no greater than the working stroke (preferably by the amount of half the working stroke). The disk brake of FIG. 20d comprises separate adjusting devices (elements 21, 23 and 27, 29) on both sides of the brake disk 3, a lower projection 250 of the caliper 1 being screwed by bolts 252 or the like to the axle flange 11. The bolt(s) penetrate(s) a bearing bush 256, which is screwed into an opening 258 of the projection 250 of the caliper 1 and is designed such that a displaceability of the caliper 1 is achieved relative to the axle flange 11 by the amount of half the working stroke "A/2".

FIG. 20e shows a so-called hinged caliper disk brake in which the caliper is disposed on the brake anchor plate or an axle part and is swivellable about a given angle (pivot bearing 35 with the strut connection 37 to the actual hinged caliper 1).

According to FIG. 20e, this swivelling angle α is selected to be large enough that the entire wear adjusting path can be bridged when the caliper is swivelled.

In this variant, the basic construction of the application mechanism in the interior of the caliper again corresponds to the application mechanism of FIG. 1c; that is, no adjusting components are provided on the reaction side, but the brake pad arranged there is directly or indirectly supported on the caliper, in which case no adjusting possibility exists between the brake pad and the caliper.

In contrast, FIG. 20f shows a disk brake with a swivellable caliper 1, which again has a pivot bearing 39. The "hinged caliper" disposed by way of the strut connection 37 on the pivot bearing, however, can be swivelled only by an angle α which is large enough that the brake pads can be swivelled by the path of half the working stroke relative to the brake disk 3. This disk brake also has an application device only on one side of the brake disk 3, but has at least one adjusting device on both sides of the brake disk.

For limiting the movement or limiting the adjusting angle, the caliper 1 is again provided with a lower projection 260 for forming the strut connection 37. The projection 260 is screwed to the axle flange 11 by means of a bolt 252. The bolt penetrates a bearing bush 262 which, here, is constructed, for example, as a rubber bearing bush with an integrated device for the restoring cup spring or the like. The rubber bearing bush is designed such that a swivellability is ensured such that the caliper is swivelled in the area of the pads by the amount of half the working stroke "A/2".

Figure 21:
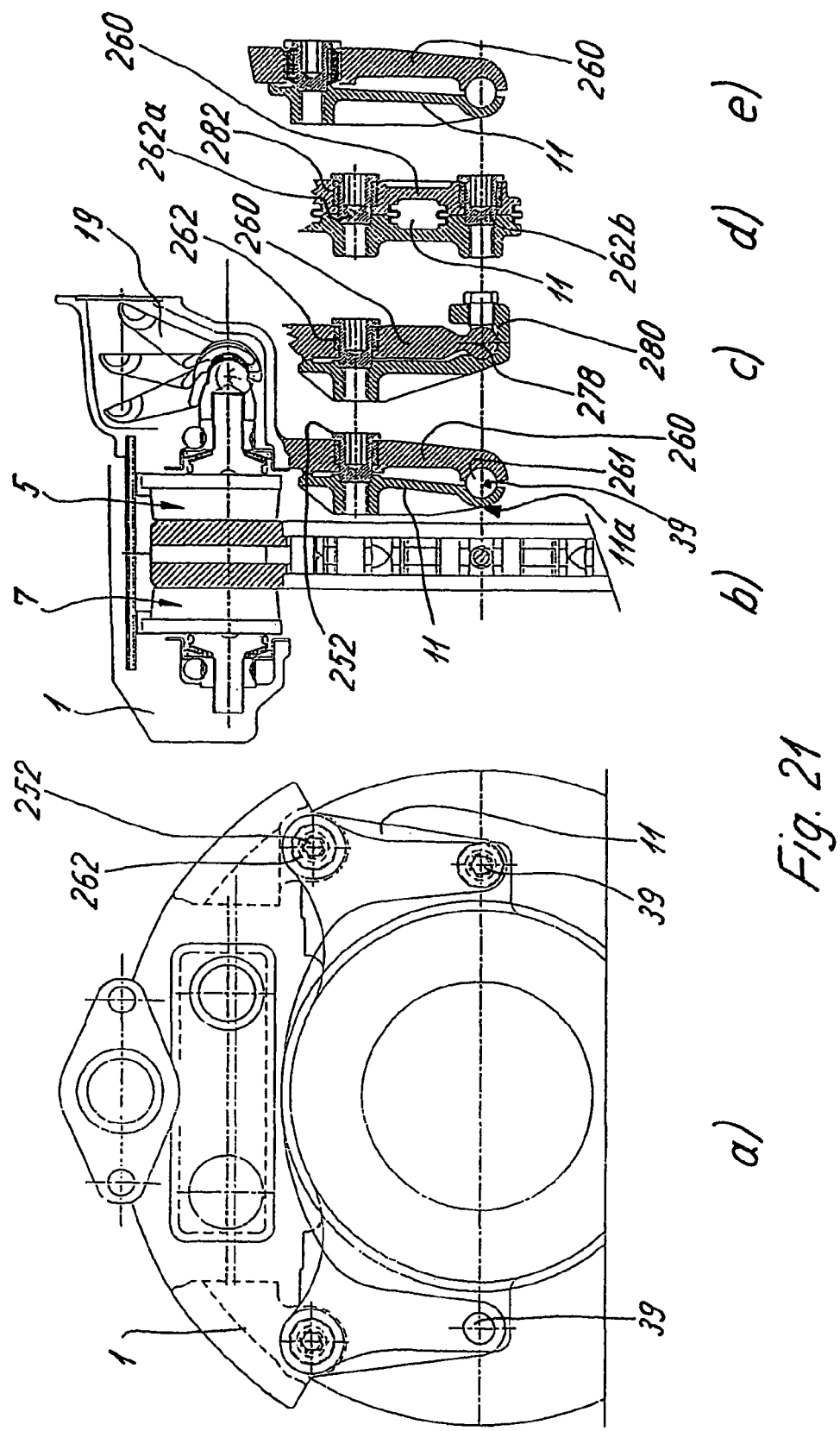
FIG. 21 shows different views and variants of disk brakes of the type of FIG. 20*f*.

FIGS. 21a and b show another representation of a brake of the type of FIG. 20f, in which case, according to FIGS. 21a and b, the projection 260 can be swivelled about a cylindrical bearing bolt 261, which bolt can be rotated in a recess 11a of the axle flange 11. In addition, FIG. 21a shows that two bearings 39 are provided. The construction of the application system and of the adjusting system corresponds to FIG. 23.

In contrast, according to FIG. 21c, the projection is provided with a spherical or cylindrical bearing projection 278 on its end facing away from the remained of the caliper 1, which bearing projection 278 is disposed in a recess 280.

Figure 22:
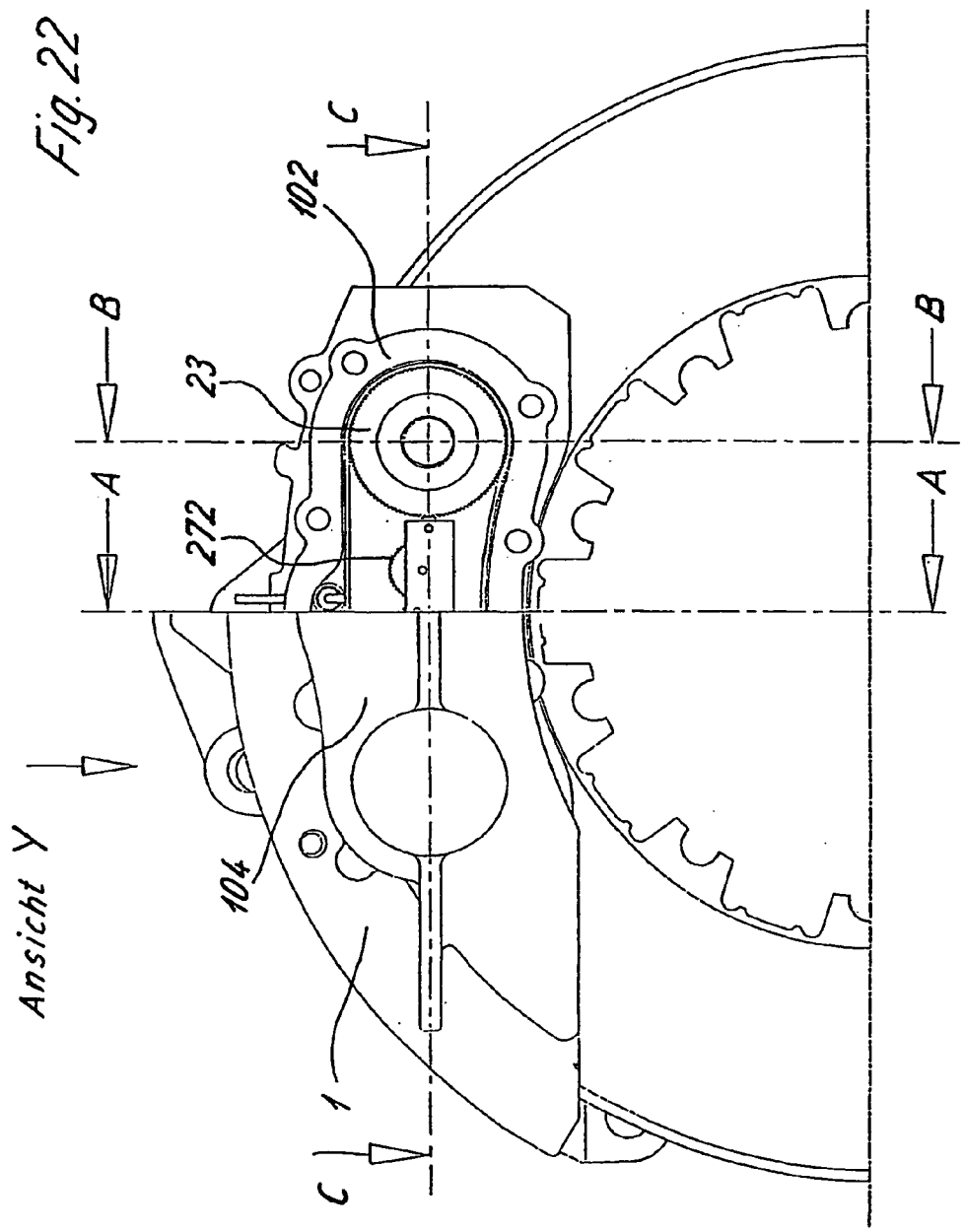
FIGS. 22–26 are views and sectional views of another disk brake.

According to FIG. 22d, two bearing bushes 262a, 262b are provided for implementing the swivellability, which bearing bushes 262a, 262b are framed by a rubber ring 282.

The disk brakes constructed according to FIGS. 22 to 27 can be mounted as "micro-sliding disk brakes" in the manner of FIGS. 1d and 20d on the axle flange or the brake anchor plate (not shown here). As an alternative, a design as a "micro-swivellable disk brake" according to the type of FIG. 20f would also be possible.

The caliper 1 provided with a recess above the brake disk, in the upper peripheral area, reaches in a frame-type manner around the brake disk 3, the brake pads 5, 7, the application device 13 constructed on one side of the brake disk, and the two adjusting devices on both sides of the brake disk 3.

Figure 23:
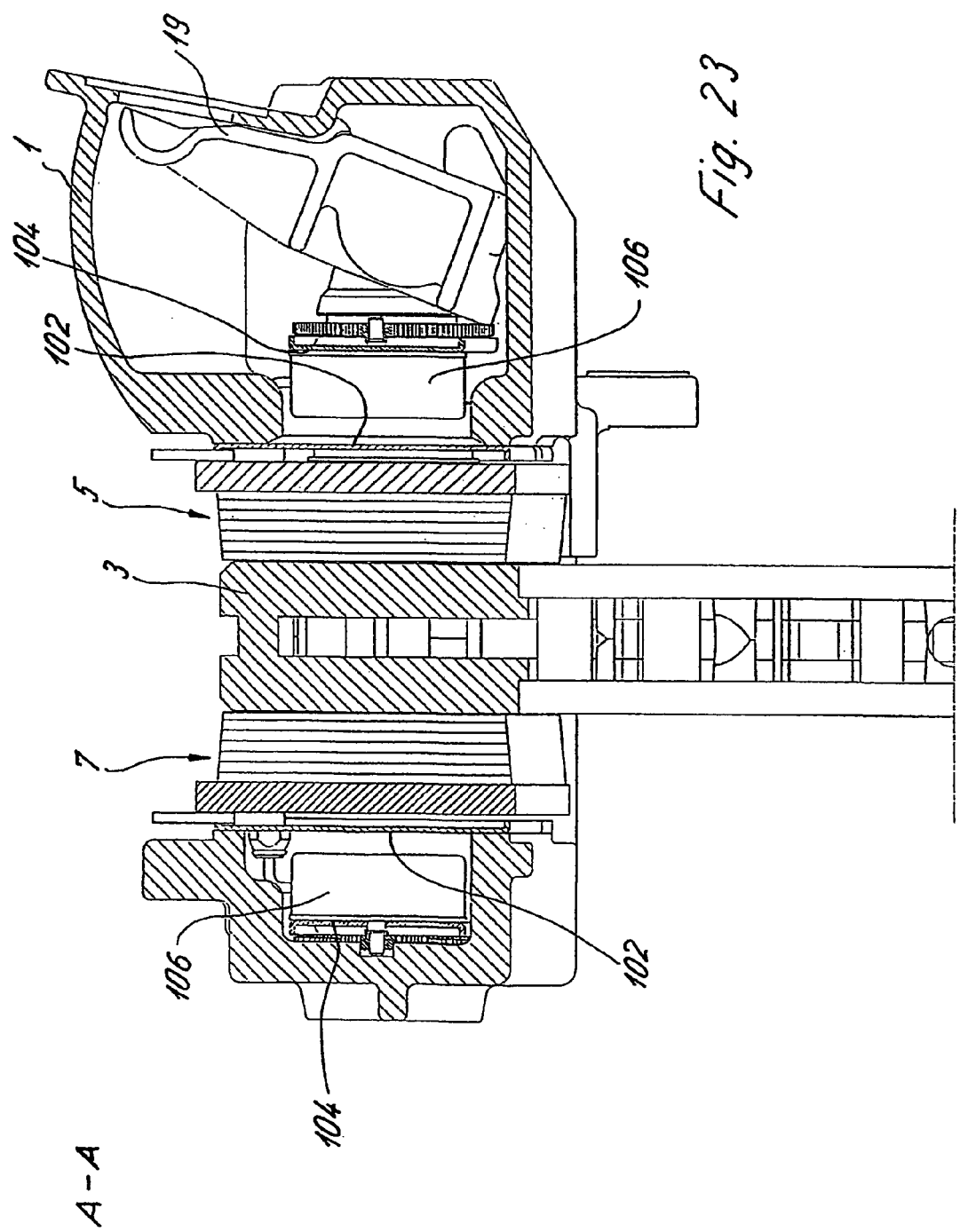
Figure 24:
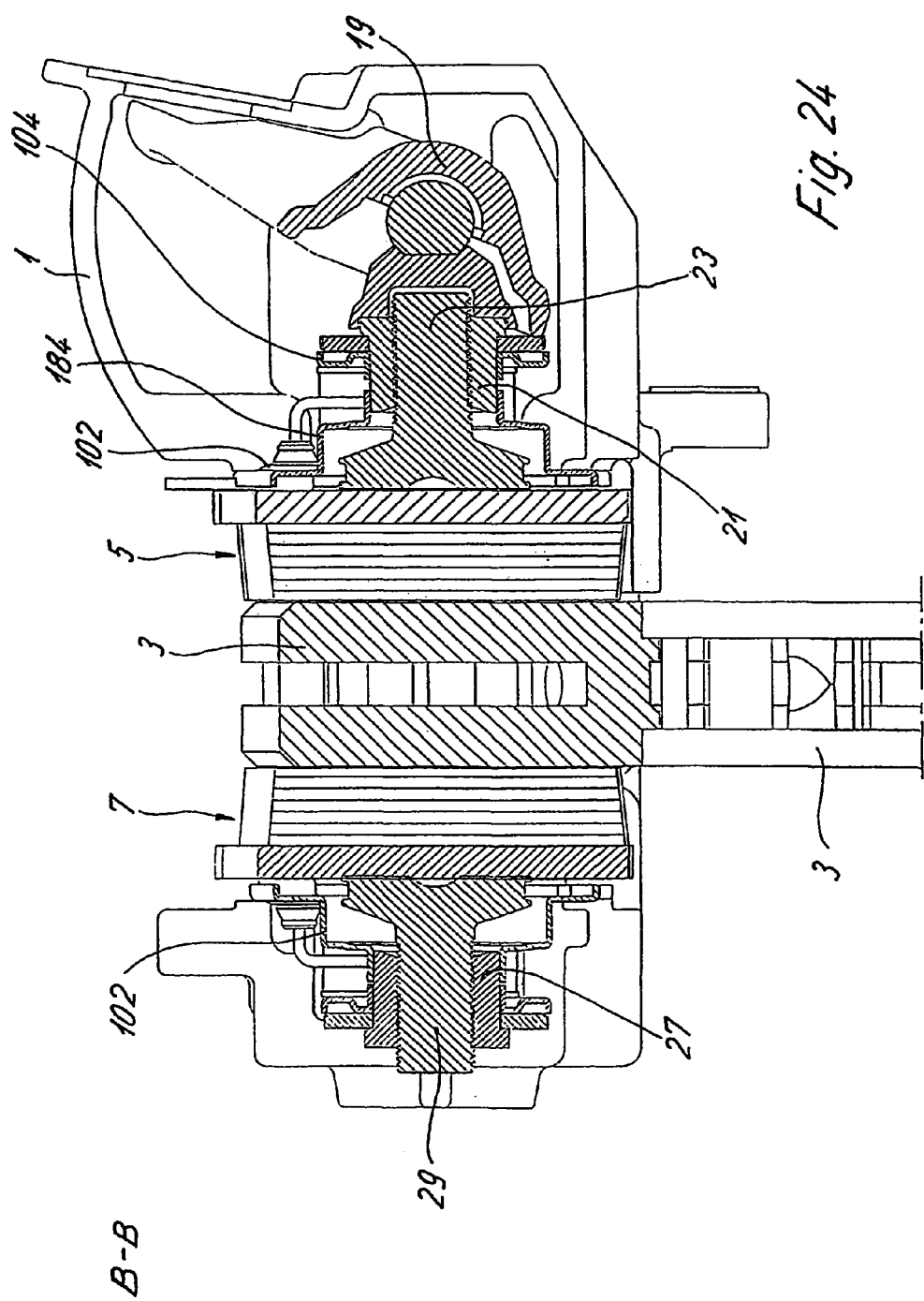
Figure 25:
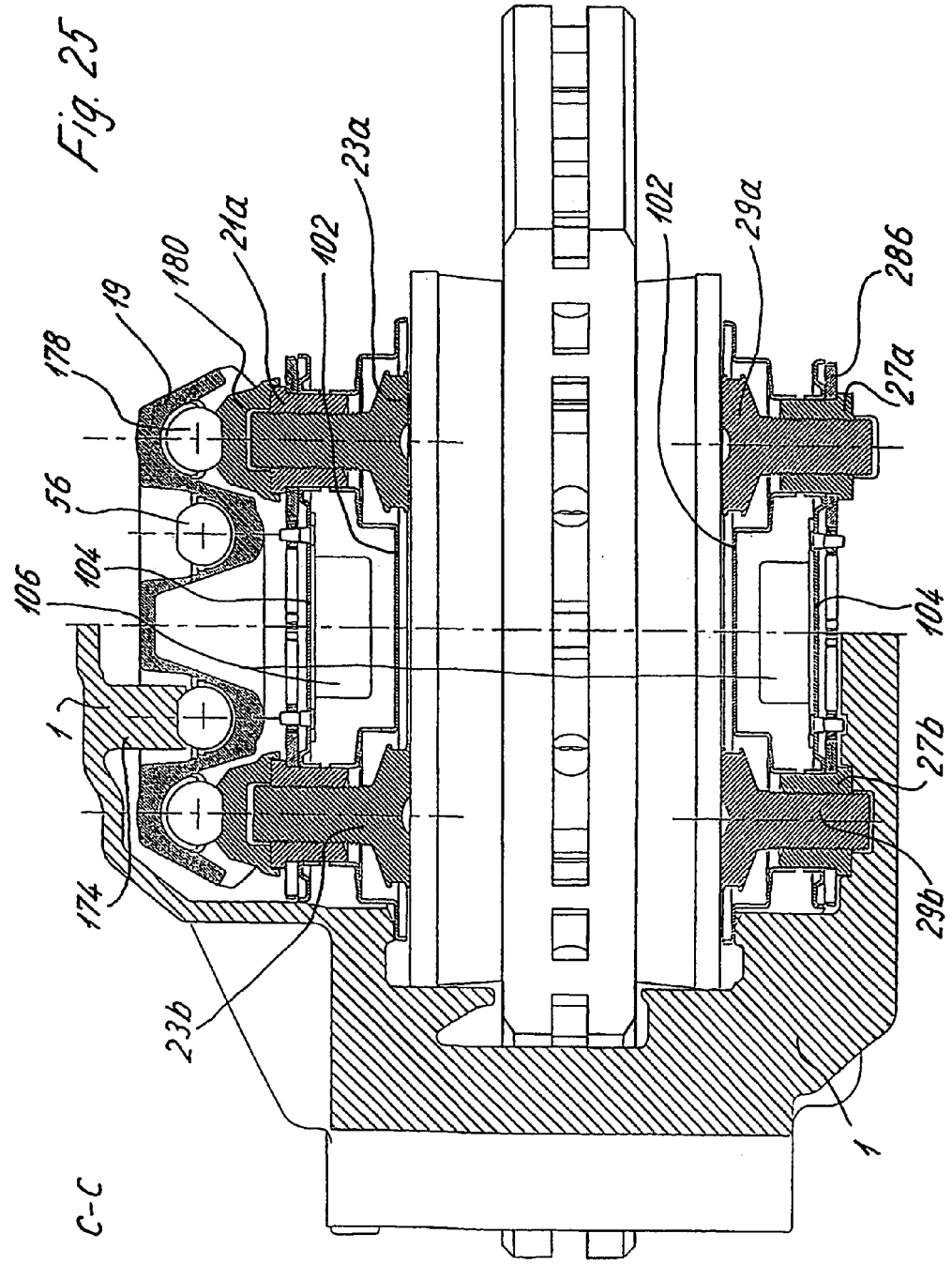
Figure 26:
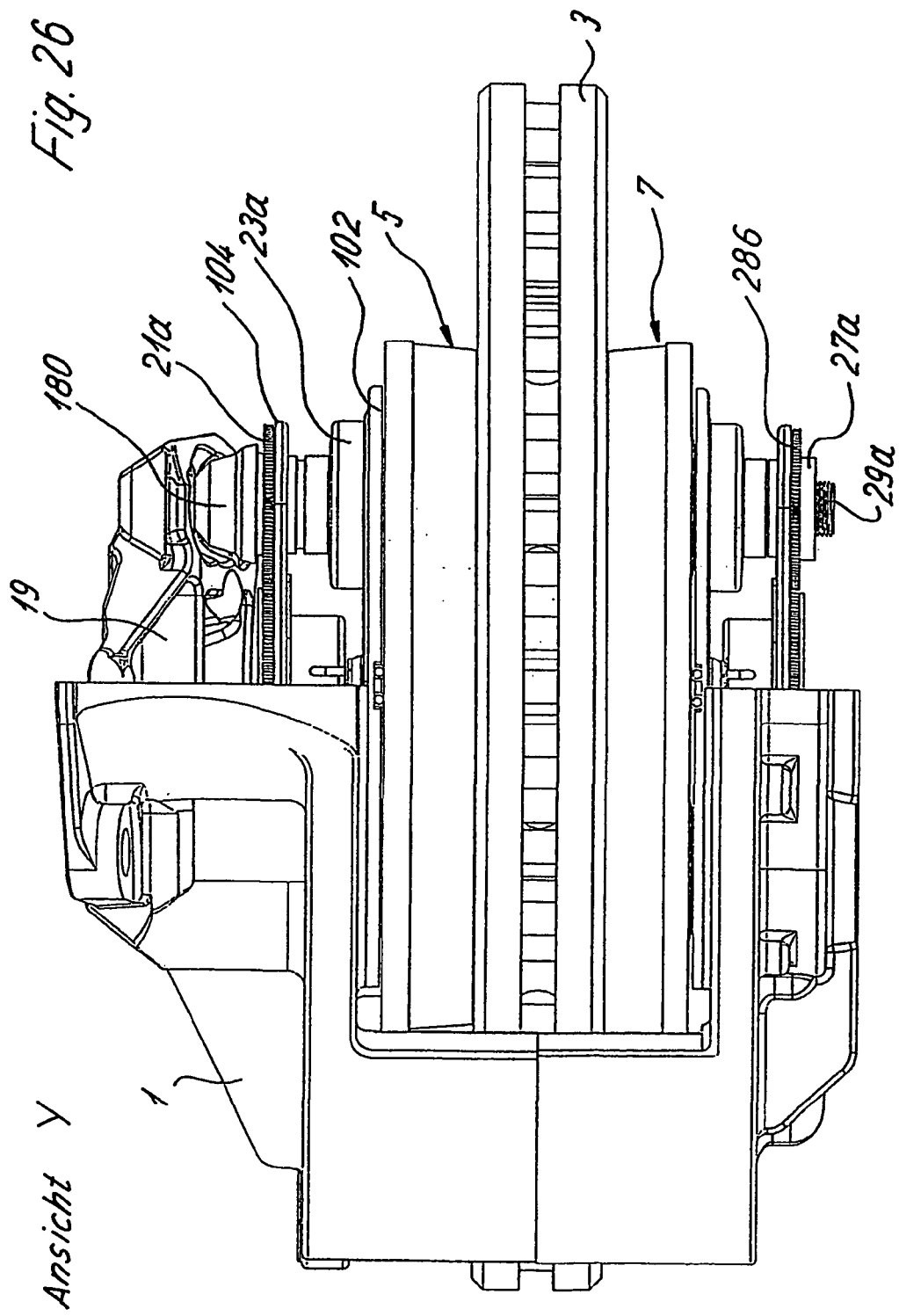
Figure 27:
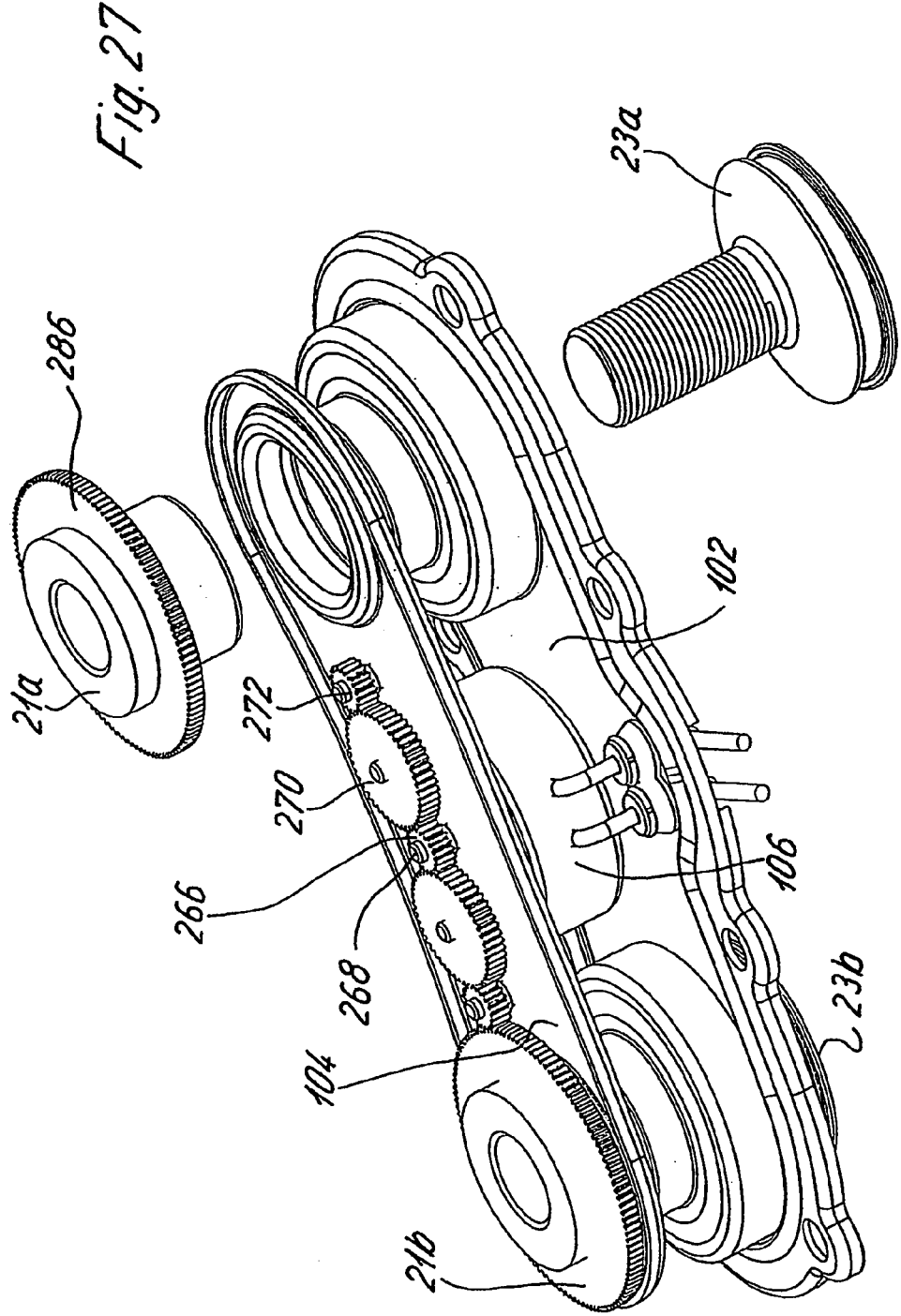
FIG. 27 is a view of the adjusting module for the brake of FIGS. 22–26.

The recess 206 for the adjusting module on the reaction side is easily recognizable in FIG. 23. On its side facing the brake disk, the caliper in each case is closed by the mounting or base plate 104. For each adjusting module on each side of the brake disk, one of the electric motors 106 is in each case situated between the two thrust pieces 23a, b; 29a, b and the adjusting sleeves 21a, b; 27a, b. An output shaft 268 is provided with an output gearwheel 266 penetrating the mounting plate 102, where, in a constructively simple and cost-effective manner, it meshes with two gearwheels 270, 272 situated opposite one another at the outer circumference of the output shaft, which gearwheels 270, 272, in turn, mesh with the adjusting sleeves 21, 23 toothed on their circumference or having a gearwheel 286. The mounting plate 104 and the mounting preform 102 are provided with shaped-out sections for receiving the thrust pieces 23, 29 and the adjusting sleeves 21, 27.

During the mounting, the rotary lever 19 is first inserted into the caliper, whereupon the two adjusting modules are inserted into the caliper, the mounting plates 104 in each case being screwed together with the caliper.

| Table of Reference Numbers | |
|---|---|
| Caliper | 1 |
| brake disk | 3 |
| brake pads | 5, 7 |
| brake anchor plate (carrier) | 5a, 7a |
| pad material (friction material) | 5b, 7b |
| bolt | 9 |
| axle flange | 11 |
| recess | 11a |
| brake application devices | 13, 15 |
| opening | 17 |
| rotary lever | 19 |
| adjusting sleeve | 21 |
| thrust piece | 23 |
| rotary lever | 25 |
| adjusting sleeve | 27 |
| thrust piece | 29 |
| pivot bearing | 35 |
| strut connection | 37 |
| pivot bearing | 39 |
| adjuster module | 50 |
| output gearwheel | 52 |
| free-wheel and/or overload coupling device | 53 |
| synchronization chain | 54 |
| bearing balls | 56a, b |
| gearwheels | 58a, b, 60a, b |
| shafts | 59a, b |
| cylindrical worms | 62a, b |
| gearwheels | 64a, b; 66a, b |
| synchronization chains | 68, 70 |
| Bowden cable | 72 |
| cable channel | 74 |
| sealing stopper | 76 |
| driving device | 82 |
| shift fork | 84 |
| shaft | 86 |
| adjuster module | 100 |
| mounting plates | 102, 104 |
| electric motor | 106 |
| gear | 108 |
| bores | 110 |
| mounting metal sheet | 114 |
| spacers, bends | 116, 118 |
| gearwheels | 117a, b |
| output gearwheel | 120 |
| gearwheel | 122 |
| shaft | 124 |
| cylindrical worms | 126a, b |
| gearwheels | 128a, 128b |
| shafts | 130a, 130b |
| gearwheels | 132a, 132b |
| recess | 150 |
| triangular section | 152 |
| recesses | 154, 156 |
| traverse-type section | 158 |
| recesses | 160a, b, 162a, b and 164, 165 |
| slide bearing shells | 170a, b, 172a, b |
| components | 174a, b |
| recesses | 176, 177 |
| spherical ends or balls | 178a, b |
| intermediate pieces | 180 |
| recess | 200 |
| indentations | 200a, 200b |
| bores | 204 |
| recess | 206 |
| driving device | 220 |
| oblong hole | 222 |
| toothed rack profile | 224 |
| gearwheels | 226, 228 |
| shaft | 230 |
| cylindrical worms | 232, 234 |
| receiving devices | 235, 236 |
| flattenings | 237, 238 |
| stripper | 239 |
| seat | 240 |
| spring dowel sleeve | 241 |
| indentations | 242 |

-continued

| Table of Reference Numbers | |
|---|---|
| projections | 243 |
| projections | 244 |
| shaped-out sections | 245 |
| recesses | 246 |
| extension | 247 |
| bores | 248 |
| grease receiving grooves | 249 |
| projection | 250 |
| bolt | 252 |
| bearing bush | 254 |
| bearing bush | 256 |
| opening | 258 |
| projection | 260 |
| bearing bolt | 261 |
| bearing bush | 262 |
| output gearwheel | 266 |
| output shaft | 268 |
| gearwheels | 270, 272 |
| brake cylinder | 274 |
| piston rod | 276 |
| bearing projection | 278 |
| recess | 280 |
| rubber ring | 282 |
| gearwheel | 286 |
| elastic area | 290 |
| elastic element | 292 |
| projection | 294 |
| bolt | 296 |
| seals | 298, 299 |
| sliding paths | S, A/2 |

What is claimed is:

1. A brake application device component for use in a pneumatically or electromotively driven disc brake, comprising:
    a rotary lever having first and second ends, wherein the first end is adapted to engage an actuating rod for the disc brake, and the second end has recesses formed on both exterior sides of the rotary lever; and
    at least one of essentially cup-type bearing shells and essentially spherical bearing elements or ball bearings insertable into the recesses at the second end, the shells, elements and/or bearings being configured to support the rotary lever on one exterior side on a housing of the disc brake as a lever bearing and on another exterior side on components displaceable toward a brake disc of the disc brake as an eccentric bearing when in use.

2. The brake application device component according to claim 1, wherein the rotary lever widens from the first end to a transverse-shaped section at the second end.

3. The brake application device component according to claim 1, wherein the bearing shells are constructed as slide bearing shells.

4. The brake application device component according to claim 2, wherein the lever bearing and the eccentric bearing are constructed in the traverse-shaped section of the rotary lever arranged at a right angle with respect to a lever arm.

5. The brake application device component according to claim 2, wherein in the traverse-shaped section of the rotary lever, two outer recesses forming eccentric cups are arranged on one side of the transverse-shaped section, and two recesses forming lever cups are arranged interiorioly on an opposite side of the traverse-shaped section relative to the eccentric cup recesses.

6. The brake application device component according to claim 4, wherein the spherical bearing elements of the lever bearing and the eccentric bearing are arranged on the traverse-shaped section of the rotary lever on opposite sides with an opposite pressure direction, respectively.

7. The brake application device component according to claim 6, wherein the spherical bearing elements, with their ball centers, in a longitudinal direction of the traverse-shaped section perpendicular to the lever arm and parallel to the brake disk, as well as transversely to this longitudinal direction, are arranged in a mutually spaced manner.

8. The brake application device component according to claim 7, wherein the mutually spaced spherical bearing elements of the rotary lever and eccentric bearings are each arranged in the traverse-shaped section of the rotary lever such that the ball centers are situated almost or completely on a connection plane with a pivot of operation on the lever arm.

9. The brake application device component according to claim 1, wherein the spherical bearing elements or ball bearings are received in bearing cups in components in each case facing away from a slide bearing shell, and wherein the cups have a cup diameter which is by a given amount larger than a ball diameter, so that, when the rotary lever is operated, the spherical bearing elements, in addition to sliding movement in the bearing shells, also carry out a limited rolling motion in an opposite receiving cup.

10. A brake application device for use in a pneumatically or electromotively driven disc brake, the brake application device comprising:
at least one thrust piece operably configured to displace a brake pad toward a brake disc when in use;
a rotary lever having first and second ends, wherein the first end is adapted to engage an actuating rod for the disc brake, and the second end has recesses formed on both exterior sides of the rotary lever; and
at least one of essentially cup-type bearing shells and essentially spherical bearing elements or ball bearings insertable into the recesses at the second end, the shells, elements and/or bearings being configured to support the rotary lever on one exterior side on a housing of the disc brake as a lever bearing and on another exterior side on the thrust piece as an eccentric bearing.

11. The brake application device according to claim 10, wherein the rotary lever widens from the first end to a transverse-shaped section at the second end.

12. The brake application device according to claim 10, wherein the bearing shells are constructed as slide bearing shells.

13. The brake application device according to claim 11, wherein the lever bearing and eccentric bearing are constructed in the traverse-shaped section of the rotary lever arranged at a right angle with respect to a lever arm.

14. The brake application device according to claim 11, wherein in the traverse-shaped section of the rotary lever, two outer recesses forming eccentric cups are arranged on one side of the transverse-shaped section, and two recesses forming lever cups are arranged interiorioly on an opposite side of the traverse-shaped section relative to the eccentric cup recesses.

15. The brake application device according to claim 13, further comprising the spherical bearing elements of the lever bearing and the eccentric bearing being arranged on the traverse-shaped section of the rotary lever on opposite sides with an opposite pressure direction, respectively.

16. The brake application device according to claim 15, wherein the spherical bearing elements, with their ball centers, in a longitudinal direction of the traverse-shaped section perpendicular to the lever arm and parallel to the brake disk, as well as transversely to this longitudinal direction, are arranged in a mutually spaced manner.

17. The brake application device according to claim 16, wherein the mutually spaced spherical bearing elements of the lever and eccentric bearings are each arranged in the traverse-shaped section of the rotary lever such that the ball centers are situated almost or completely on a connection plane with a pivot of operation on the lever arm.

18. The brake application device according to claim 10, wherein the spherical bearing elements or bearing balls are received in bearing cups in components in each case facing away from a slide bearing shell, and wherein the cups have a cup diameter which is by a given amount larger than a ball diameter, so that, when the rotary lever is operated, the spherical bearing elements, in addition to sliding movement in the bearing shells, also carry out a limited rolling motion in an opposite receiving cup.

\* \* \* \* \*